US012493399B1

(12) United States Patent
Cabral

(10) Patent No.: US 12,493,399 B1
(45) Date of Patent: Dec. 9, 2025

(54) INTERACTIVE REAL ESTATE TOOL

(71) Applicant: Justin Ryan Cabral, Watertown, CT (US)

(72) Inventor: Justin Ryan Cabral, Watertown, CT (US)

( * ) Notice: Subject to any disclaimer, the term of this patent is extended or adjusted under 35 U.S.C. 154(b) by 0 days.

(21) Appl. No.: 19/296,347

(22) Filed: Aug. 11, 2025

Related U.S. Application Data

(60) Provisional application No. 63/801,901, filed on May 8, 2025.

(51) Int. Cl.

| | | |
|---|---|---|
| *G06F 3/048* | (2013.01) | |
| *G06F 3/0482* | (2013.01) | |
| *G06F 3/0484* | (2022.01) | |
| *G06F 3/0488* | (2022.01) | |
| *G06F 9/451* | (2018.01) | |
| *G06Q 50/16* | (2012.01) | |

(52) U.S. Cl.
CPC .......... *G06F 3/0484* (2013.01); *G06F 3/0482* (2013.01); *G06F 3/0488* (2013.01); *G06F 9/451* (2018.02); *G06Q 50/16* (2013.01)

(58) Field of Classification Search
CPC ...... G06F 3/0484; G06F 9/451; G06F 3/0482; G06F 3/0488; G06Q 50/16
See application file for complete search history.

(56) References Cited

U.S. PATENT DOCUMENTS

| | | | | |
|---|---|---|---|---|
| 6,636,803 B1 * | 10/2003 | Hartz, Jr. ............... | G06Q 50/16 | |
| | | | 701/454 | |
| 9,009,610 B2 * | 4/2015 | Florance ................. | G06F 16/29 | |
| | | | 715/781 | |
| 12,267,313 B2 * | 4/2025 | Talavera ............. | H04L 63/0815 | |
| 2005/0288959 A1 * | 12/2005 | Eraker ............... | G06Q 30/0603 | |
| | | | 709/202 | |
| 2014/0279255 A1 * | 9/2014 | Kardell ............. | G06Q 30/0625 | |
| | | | 705/26.62 | |
| 2017/0032481 A1 * | 2/2017 | D'Souza ................. | G06F 18/22 | |
| 2018/0007340 A1 * | 1/2018 | Stachowski ............ | H04N 23/63 | |

(Continued)

FOREIGN PATENT DOCUMENTS

KR     102374155 B1 *  3/2022   ............. G06Q 50/16

*Primary Examiner* — Patrick F Riegler
(74) *Attorney, Agent, or Firm* — Carmody Torrance Sandak & Hennessey LLP

(57) ABSTRACT

A computer-implemented method for searching, viewing and saving real estate property listings. A first interactive GUI is generated comprising a criteria selector pane and a first property display pane. The user interacts with the first interactive GUI to generate a selection of real estate property by selecting search criteria. The user can view the selection of real estate property listings and perform one or more of: (1) tapping on a right portion or left portion of the first property display pane to reveal additional information regarding the individual real estate listing displayed in the first property display pane; (2) swiping right on the first property display pane to indicate a "like" of the individual real estate property listing displayed in the first property display pane; (3) swiping left on the first property listing window to indicate "dislike" of the individual real estate property listing displayed in the first property display pane; and (4) swiping up on the first property display pane to schedule a showing of the individual real estate property listing.

24 Claims, 20 Drawing Sheets

(56) References Cited

U.S. PATENT DOCUMENTS

| | | | | |
|---|---|---|---|---|
| 2018/0032536 | A1* | 2/2018 | Stachowski | G06Q 50/16 |
| 2019/0164240 | A1* | 5/2019 | Barbara | G06F 16/909 |
| 2020/0404054 | A1* | 12/2020 | Avrahami | H04L 65/611 |
| 2021/0241397 | A1* | 8/2021 | Norelius | G06Q 30/0613 |
| 2022/0148109 | A1* | 5/2022 | Hoyt | G06Q 10/04 |
| 2023/0089025 | A1* | 3/2023 | Bomze | G06N 20/00 |
| | | | | 705/315 |
| 2023/0130143 | A1* | 4/2023 | Chandy | G06F 16/9535 |
| | | | | 705/27.2 |
| 2024/0005422 | A1* | 1/2024 | Basir | G06Q 50/16 |
| 2024/0331022 | A1* | 10/2024 | Tucker | G06Q 50/16 |
| 2025/0117261 | A1* | 4/2025 | Talavera | G06F 9/505 |

* cited by examiner

INTERACTIVE REAL ESTATE TOOL

CROSS-REFERENCE TO RELATED APPLICATIONS

The present application claims the benefit of U.S. provisional application Ser. No. 63/801,901 filed on May 8, 2025, the subject matter of which is herein incorporated by reference in its entirety.

FIELD OF INVENTION

The present invention relates generally to an interactive real estate tool that provides an enhanced user experience.

BACKGROUND OF THE INVENTION

A multiple listing service (MLS) is a database that is created and maintained by cooperating real estate professionals to share information regarding properties on the market, including details such as listing price, bedrooms, bathrooms, square footage and other data points relevant to potential buyers. There are hundreds of MLSs across the country using a common set of rules to enable a smooth exchange of information in their local communities. Many MLSs, as a service to their members, also provide listing information to third-party aggregators such as Realtor®.com, Zillow®, and others through syndication or other similar type agreements, unless the broker withholds consent. These third party aggregators typically include a web-based search platform to present information in the MLS to home buyers and other users in a straightforward manner so that the home buyer (i.e., user) can interact with the search platform to conduct a search for real estate properties based on various criteria of interest to the buyer.

However, typical real estate search platforms struggle with two major issues: low user engagement/enjoyment and a lack of personalization. Users often find themselves repeatedly exposed to one or more same unwanted properties because many search platforms do not offer a user-friendly or intuitive way of hiding listings in which the user is not interested. Moreover, scrolling through dozens of images per property can be tedious, with some listings containing forty or more images. Thus, the user experience in searching real estate listings can feel more like a chore rather than a discovery.

Thus, it would be desirable to provide an improved real estate search platform that overcomes the deficiencies of the prior art and that is more interactive and intuitive for the user to research and interact with relevant real estate properties and to exclude properties that are not of interest.

It is not believed that any of the major real estate platforms have addressed this deficiency because all of these major real estate platforms rely on a traditional, map-based search interface and retain the same scroll-heavy approach to image browsing. In contrast, the solution described herein is designed to offer a better, more modern alternative approach to viewing real estate listings.

SUMMARY OF THE INVENTION

It is an object of the present invention to provide an engaging, efficient, and user-friendly interface for researching and browsing real estate listings on digital platforms.

It is another object of the present invention to reduce user fatigue and frustration associated with conventional real estate listing platforms that may repeatedly display previously dismissed properties.

It is still another object of the present invention to introduce a gesture-based real estate search tool that allows users to interact with real property listings through intuitive swiping actions and gestures, including, for example, enabling users to swipe left to dismiss a property, swipe right to save a property, and/or swipe up to schedule a showing of a property.

It is still another object of the present invention to provide a full-screen, immersive experience, to allow a user to focus on one property at a time. This enhances decision-making and reduces visual clutter. Additional listing details can be revealed incrementally as users tap through images, encouraging continued interaction and discovery.

It is still another object of the present invention to provide a mechanism to allow users to reverse previous actions using a rewind button, allowing reconsideration of prior decisions and reducing the likelihood of missed opportunities due to accidental input.

As further described herein, it is another object of the present invention to provide a means for accommodating a wider range of user preferences, including, for example, dedicated on-screen action buttons perform the same functions as the gesture controls. Users can tap a "like," "dislike," "schedule showing," "rewind," or "send" button, offering an alternative method of interaction for those who prefer a more traditional button-based navigation.

In one embodiment, the present invention relates generally to computer-implemented method for searching, viewing and saving real estate property listings, wherein the computer-implemented method comprises at least a processor to execute instructions, a memory therein to store instructions, and a database populated with real estate listings, wherein the database is accessible by the processor, wherein the method comprises:

executing instructions via the processor, wherein the processor is programmed to (a) access data stored in the database, and (b) generate a first interactive graphical user interface (GUI) at a user computing device to be interacted with by a user to search, view, and a save one or more individual real estate property listings, wherein the first interactive GUI comprises a criteria selector pane, a first property display pane, one or more action buttons, and one or more user interface buttons;

populating the first interactive GUI with the data related to the real estate property listings, wherein the data related to the real estate property listings comprises one or more individual real estate property listings, and wherein the data related to the real estate property listings is stored in the database;

displaying, on a display device, the first interactive GUI;

allowing a user to interact with the first interactive GUI to generate a selection of real estate property listings comprising one or more individual real estate property listings, wherein the selection of real estate property listings is generated by selecting search criteria using the criteria selector pane, wherein upon generation of the selection of real estate property listings, at least a portion of an individual real estate property listing of the one or more real estate property listings is displayed in the first property display pane;

allowing a user to interact with the first property display pane of the first interactive GUI to view the selection of real estate property listings comprising the one or more individual real estate property listings and perform one or more of:

(1) tapping on a right portion or left portion of the first property display pane to reveal additional information regarding the individual real estate listing displayed in the first property display pane, optionally, wherein the additional information includes one or more additional images of the property;

(2) swiping right on the first property display pane to indicate a "like" of the individual real estate property listing displayed in the first property display pane, wherein the "liked" real estate property listing is saved to a saved homes GUI;

(3) swiping left on the first property listing pane to indicate "dislike" of the individual real estate property listing displayed in the first property display pane, wherein the "disliked" real estate property listing is removed from the selection of real estate property listings displayable to the user; and (4) swiping up on the first property display pane to schedule a showing of the individual real estate property listing displayed in the first property display pane, wherein swiping up on the first property display, a schedule showing pop-up window is displayed.

BRIEF DESCRIPTION OF THE FIGURES

For a fuller understanding of the invention, reference is made to the following description taken in connection with the accompanying figures in which.

Also, while all elements may not be labeled in each figure, all elements with the same reference number indicate similar or identical parts.

DETAILED DESCRIPTION OF THE INVENTION

Figure 1:
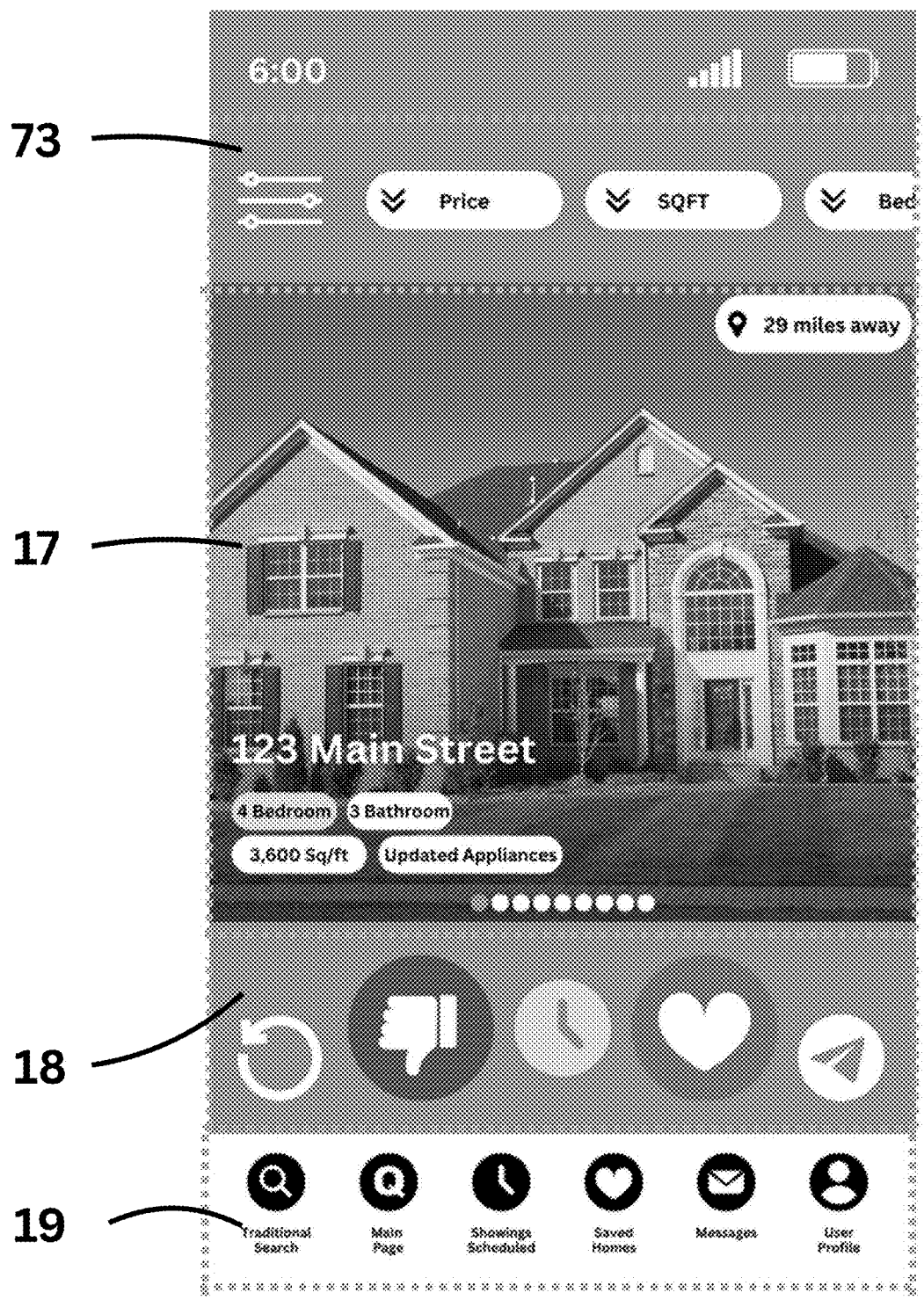
FIG. 1 depicts an example of a home screen of a first interactive graphical user interface (GUI) as further described herein.

As described herein, the present invention relates generally to interactive real estate tool that is configured to provide an enhanced user experience.

The real estate tool described herein puts user engagement and ease of use at the forefront. Each property listing takes up the entire display device (e.g., screen) of the real estate tool, drawing the user's full attention and creating an immersive experience. Interactions are intuitive and dynamic, as the user interacts with the real estate tool using gestures (e.g., tapping, clicking, and/or swiping) to like, dislike, schedule a showing, or share the listing with a friend or agent. In one embodiment, a swiping action is used, i.e., swipe left to "dislike," swipe up to schedule a showing, and swipe "right" to like the property. As users tap through (or clicks through) the images, more listing details are gradually revealed, turning the process into a storyline that encourages curiosity and continued interaction.

In addition, the "dislike" feature ensures users will not be shown the same unwanted listings again, removing the unwanted listings from the user's view for a set period or time, until all other options have been exhausted, and/or until the user changes a parameter of a property search or resets the search criteria. This solves a key frustration users face on traditional real estate platforms, where the user is forced to scroll past the same homes each time they log in.

To make photo navigation more efficient, endless scrolling is replaced with a tap-to-cycle system. Users can tap the left or right side of the display device to move through images quickly and easily, making the experience smoother and more enjoyable for the user.

In one embodiment, and as described in detail herein, the present invention relates generally to a computer-implemented method for searching, viewing and saving real estate property listings, wherein the computer-implemented method comprises at least a processor to execute instructions, a memory therein to store instructions, and a database populated with real estate listings, wherein the database is accessible by the processor, wherein the method comprises:

executing instructions via the processor, wherein the processor is programmed to (a) access data stored in the database, and (b) generate a first interactive graphical user interface (GUI) at a user computing device to be interacted with by a user to search, view, and a save one or more individual real estate property listings, wherein the first interactive GUI comprises a criteria selector pane, a first property display pane, one or more action buttons, and one or more user interface buttons;

populating the first interactive GUI with the data related to the real estate property listings, wherein the data related to the real estate property listings comprises one or more individual real estate property listings, and wherein the data related to the real estate property listings is stored in the database;

displaying, on a display device, the first interactive GUI;
allowing a user to interact with the first interactive GUI to generate a selection of real estate property listings comprising one or more individual real estate property listings, wherein the selection of real estate property listings is generated by selecting search criteria using the criteria selector pane, wherein upon generation of the selection of real estate property listings, at least a portion of an individual real estate property listing of the one or more real estate property listings is displayed in the first property display pane;
allowing a user to interact with the first property display pane of the first interactive GUI to view the selection of real estate property listings comprising the one or more individual real estate property listings and perform one or more of:
(1) tapping on a right portion or left portion of the first property display pane to reveal additional information regarding the individual real estate listing displayed in the first property display pane, optionally, wherein the additional information includes one or more additional images of the property;
(2) swiping right on the first property display pane to indicate a "like" of the individual real estate property listing displayed in the first property display pane, wherein the "liked" real estate property listing is saved to a saved homes GUI;
(3) swiping left on the first property listing pane to indicate "dislike" of the individual real estate property listing displayed in the first property display pane, wherein the "disliked" real estate property listing is removed from the selection of real estate property listings displayable to the user; and
(4) swiping up on the first property display pane to schedule a showing of the individual real estate property listing displayed in the first property display pane, wherein swiping up on the first property display, a schedule showing pop-up window is displayed.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform herein. Furthermore, it is also to be understood that the value to which the modifier "about" refers is itself specifically disclosed herein.

As used herein, spatially relative terms, such as "beneath," "below," "lower," "above," "upper," "left," "right," "up," and the like, are used for ease of description to describe one element or feature's relationship or location relative to another element(s) or feature(s) as illustrated in the figures. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As used herein, the term "tap" refers to a swift, light touch by the user on the display device (using e.g., a finger, stylus, knuckle, etc.).

As used herein, the term "swipe" refers to a motion of a user against a surface of the display device (using e.g., a finger, stylus, knuckle, etc.) in a given direction. That is to "swipe left," the motion would be from right to left, to "swipe right," the motion would be from left to right, and to "swipe up," the motion would be from a lower portion of the display device towards an upper portion of the display device.

As used herein, the term "click" refers to the action of pressing and releasing an input button such as a mouse, a touchpad, or touch-sensitive screen or device (e.g., phone or tablet screen) to interact with the real estate tool.

As used herein, the term "window" refers to a separate visual area on the display device.

As used herein, the term "pane" refers to an area within a window that displays specific information or functionality.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described herein, the present invention includes a computer-implemented method for searching, viewing and saving real estate property listings, wherein the computer-implemented method comprises at least a processor to execute instructions, a memory therein to store instructions, and a database populated with real estate listings, wherein the database is accessible by the processor.

In one embodiment, the computer system comprises at least one of the following: a smartphone; a tablet computing device, a PDA (Personal Digital Assistant), a laptop computer, and a wearable device. Each step of the various methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood that each step described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

As described herein, the online real estate platform includes at least one memory storing one or more programs for execution by one or more processors.

The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts described herein.

In one embodiment, the online real estate platform comprises one or more processors that can be implemented as one or more integrated circuits (e.g., a conventional microprocessor or microcontroller) to control the operation of the online real estate platform. These processors may include single core or multicore processors. In certain embodiments, the one or more processors may be included in a processing unit that comprises the one or more processors. In other embodiments, the one or more processors may be implemented as one or more independent processing units with single or multicore processors included in each processing unit. In other embodiments, processing unit may also be implemented as a quad-core processing unit formed by integrating two dual-core processors into a single chip.

In various embodiments, the processor (whether standalone or included in a processing unit) can execute a variety of programs in response to program code and can maintain multiple concurrently executing programs or processes. At any given time, some or all of the program code to be executed can be resident in processor(s) and/or in storage subsystem. Through suitable programming, processor(s) can provide various functionalities as described in further detail herein. Computer system may additionally include a processing acceleration unit which can include a digital signal processor (DSP), a special-purpose processor, and/or the like.

Inputs/outputs (I/O) may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system to a user or other computer. For example, user interface output devices may include, without limitation, a variety of display devices that visually convey text, graphics and audio/video information such as monitors, printers, speakers, headphones, automotive navigation systems, plotters, voice output devices, and modems.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Depending on the configuration and type of computer system, system memory may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory may include multiple different types of memory, such as static random access memory (SRAM) or dynamic random access memory (DRAM). In some implementations, a basic input/output system (BIOS), containing the basic routines that help to transfer information between elements within computer system, such as during start-up, may typically be stored in the ROM. By way of example, and not limitation, system memory also includes application programs, which may include client applications, Web browsers, mid-tier applications, relational database management systems (RDBMS), etc., program data, and an operating system. By way of example, operating system may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage may be provided by providing a tangible computer-readable storage medium for storing the basic programming and data constructs that provide the functionality of some embodiments. Software (programs, code modules, instructions) that when executed by a processor provide the functionality described above. These software modules or instructions may be executed by the processors. The computer-readable storage medium may also provide a repository for storing data.

The computer readable storage medium may include a computer-readable storage media reader that can further be connected to computer-readable storage media. Together and, optionally, in combination with system memory, computer-readable storage media may comprehensively represent remote, local, fixed, and/or removable storage devices plus storage media for temporarily and/or more permanently containing, storing, transmitting, and retrieving computer-readable information.

Computer-readable storage media containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by the computer system.

By way of example, computer-readable storage media may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for the computer system.

The computer system also typically comprises an interface for receiving data from and transmitting data to other systems from computer system. For example, communications subsystem may enable computer system to connect to one or more devices via the Internet. In some embodiments communications subsystem can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments the interface can provide wired network connectivity (e.g., Ethernet) in addition to or instead of a wireless interface.

In some embodiments, the interface may also receive input communication in the form of structured and/or unstructured data feeds, event streams, event updates, and the like on behalf of one or more users who may use computer system. For example, the interface may be configured to receive data feeds in real-time from users of social networks and/or other communication services such as Twitter® feeds, Facebook® updates, web feeds such as Rich Site Summary (RSS) feeds, and/or real-time updates from one or more third party information sources.

Additionally, the interface may also be configured to receive data in the form of continuous data streams, which may include event streams of real-time events and/or event updates, which may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

The interface may also be configured to output the structured and/or unstructured data feeds, event streams, event updates, and the like to one or more databases that may be in communication with one or more streaming data source computers coupled to computer system.

Computer system can be one of various types, including a mobile device such as a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts described herein.

The processor can be any commercially available or custom microprocessor, microcontroller, digital signal processor or the like. The memory may include any memory devices containing the software and data used to implement the functionality circuits or modules used in accordance with embodiments of the present invention. The memory can include, but is not limited to, the following types of devices: cache, ROM, PROM, EPROM, EEPROM, flash memory, SRAM, DRAM and magnetic disk. In some embodiments of the present invention, the memory may be, for example, a content addressable memory (CAM).

The memory may include several categories of software and data used in the data processing system: an operating system; application programs input/output device drivers; and data. As will be appreciated by those of skill in the art, the operating system may be any operating system suitable for use with a data processing system, such as, for example, Linux, Windows XP, Mac OS, Unix, etc. The input/output device drivers typically include software routines accessed through the operating system by the application programs to communicate with devices such as the input/output circuits and certain memory components. The application programs are illustrative of the programs that implement the various features of the circuits and modules according to some embodiments of the present invention. Finally, the data represents static and dynamic data that can be used by the application programs, the operating system, the input/output device drivers, and other software programs that may reside in the memory.

In one embodiment, the real estate tool described herein can be configured as a stand-alone product separate and apart from other real estate search platforms currently used by potential users and home buyers. In another embodiment, the real estate tool described herein can be configured as an add-on tool to an existing online real estate search platform, allowing the user to toggle between a more traditional search platform and the interactive real estate platform described herein.

In one embodiment, the real estate tool described herein is used in a computer-implemented method for searching, viewing, and saving real estate property listings as further described herein. That is, when executing instructions via the processor, the processor is programmed to (a) access data stored in the database, and (b) generate a first interactive graphical user interface (GUI) 77 at a user computing device to be interacted with by a user to search, view, and a save one or more individual real estate property listings.

FIG. 1 depicts a view of the home screen of the first interactive GUI in accordance with one aspect of the invention. As shown in FIG. 1, the first interactive GUI 77 may comprise a criteria selector pane 73, a first property display pane 17, a pane depicting one or more action buttons 18, and a pane depicting one or more user interface buttons 19.

Figure 10:
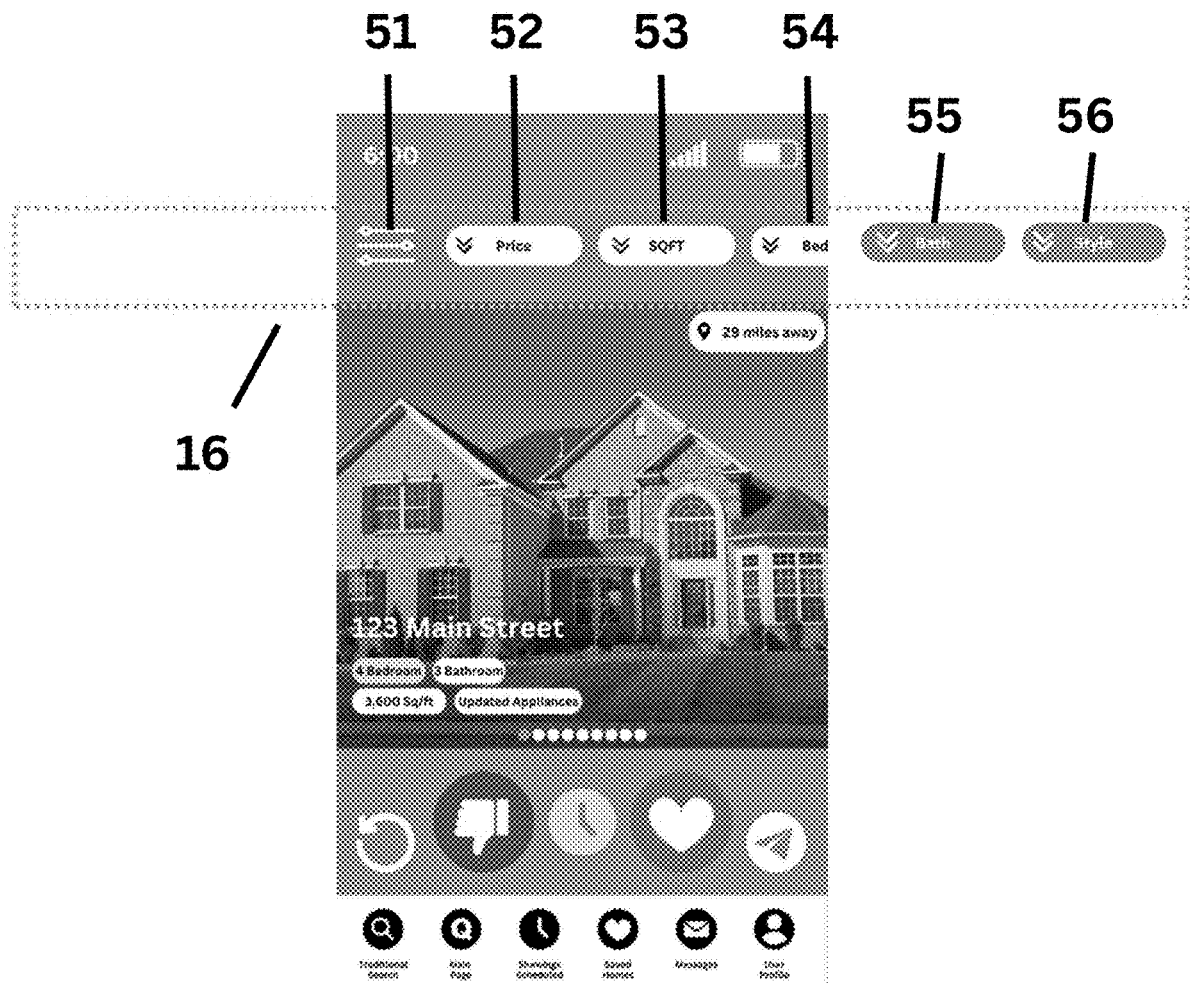
FIG. 10 depicts another view of the home screen of the first interactive GUI highlighting the criteria selector pane.

In one embodiment, the user interacts with the criteria selector pane 73 to select values (including e.g., minimum, maximum or preferred values) of search criteria such as location, price, property type, square footage, number of bedrooms, number of bathrooms, one or more property features, one or more community features, and combinations of the foregoing. For example, the user may select a minimum number of bedrooms and bathrooms and a location, among other things. As shown in FIG. 10, in one embodiment, the criteria selector pane 73 comprises one or more drop-down menus 52-56 that allow the user to select one or more search criteria. In one embodiment, the one or more search criteria may be selected from location, property type, price 52, square footage 53, number of bedrooms 54, number of bathrooms 55, property style 56, one or more property features, one or more community features, and combinations of the foregoing. As also shown in FIG. 10, in one embodiment, the criteria selector pane 73 may be horizontally scrollable, meaning that the user can swipe left or swipe right in a horizontal direction within the criteria selection header 73 to display additional search criteria that extend beyond the listing of search criteria visible in the criteria selector pane.

Once the user has selected one or more search criteria, the first interactive GUI 77 executes instructions via the processor to access data stored in the database to populate the first interactive GUI 77 with data related to particular real estate property listings that meet one more of the search criteria selected by the user.

Figure 6:
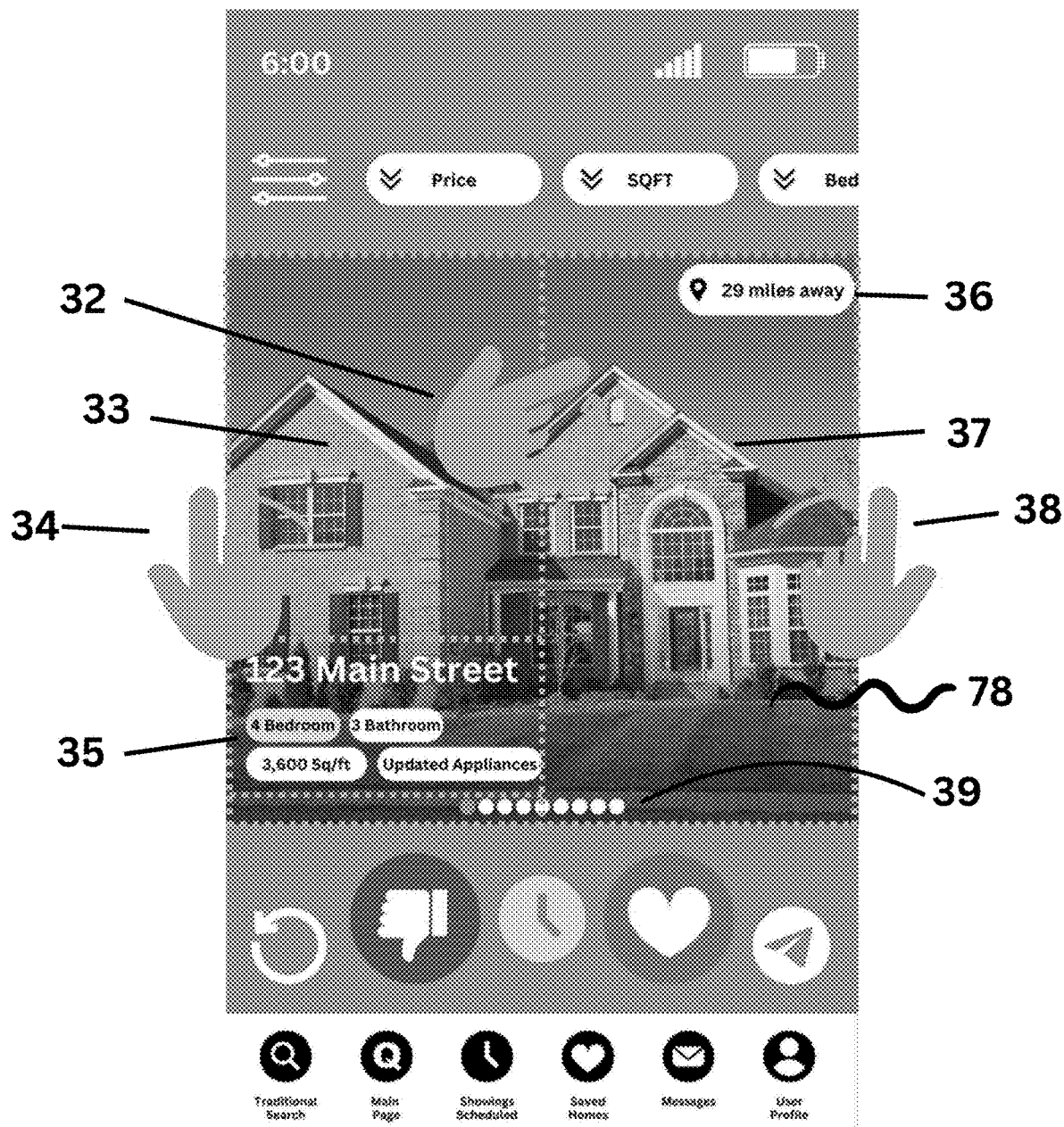
FIG. 6 depicts a view of the home screen of the first interactive GUI.
Figure 8:
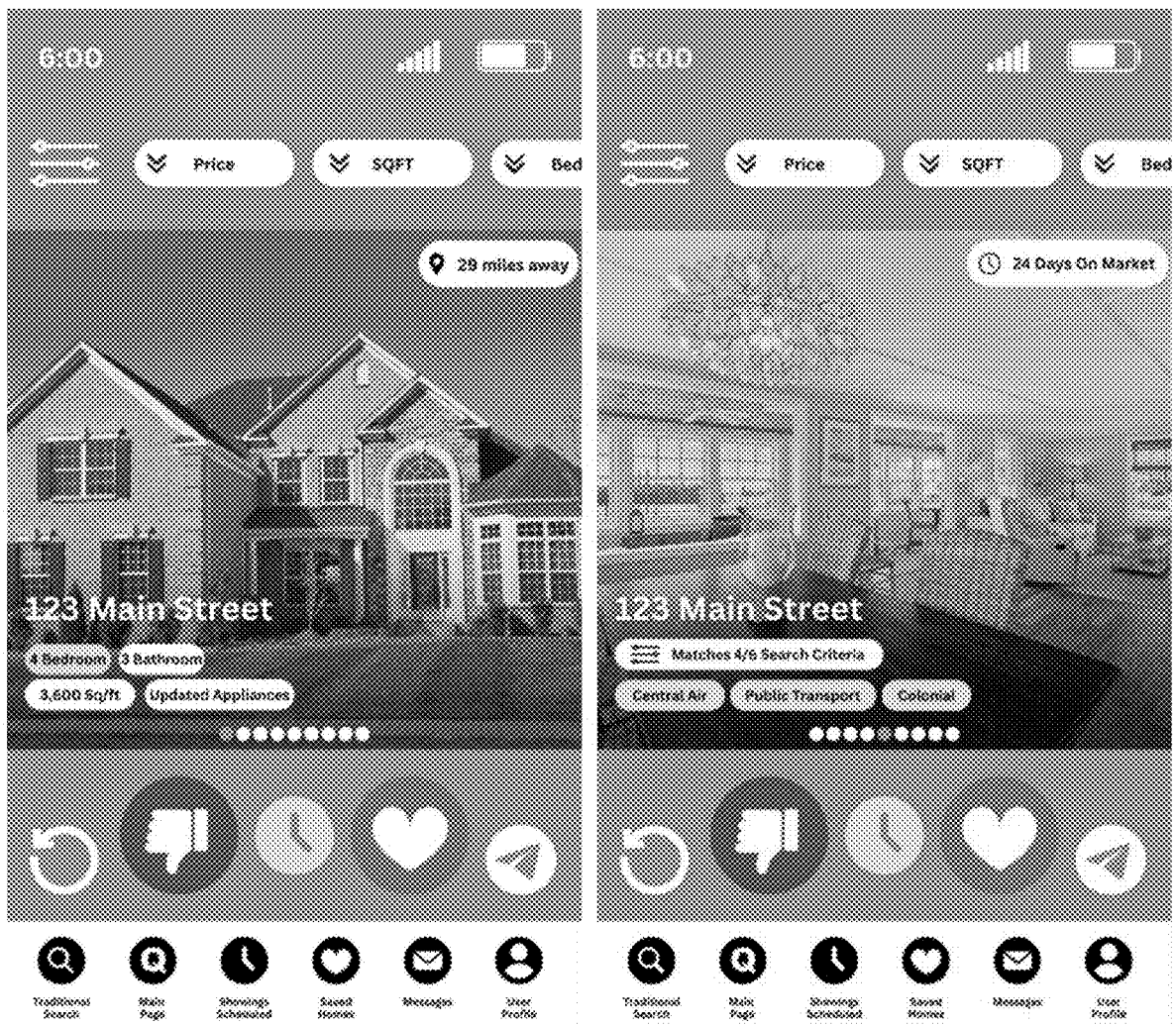
FIG. 8 depicts a different view of FIG. 7 and shows how the view of the first property display pane changes.

The first interactive GUI 77 is populated with the data related to a particular real estate property listing 78 as shown in more detail in FIG. 6 and the data related to each particular real estate property listing is stored in the database. In one embodiment, the data related to each individual property listing is obtained from one or more MLSs and the data displayed in the first property display pane 17 is sourced from the one or more MLSs. The property images are sourced from the one or more MLSs and displayed in the property display pane 17. The property address is sourced and provided in the property information area 35. In one embodiment, the property address remains visible while different property images are displayed while additional property data points may change as additional property images are displayed as shown in FIG. 8. Additional property data points such as number of bedrooms, number of bathrooms, etc. may also be displayed in the property information area 35. These property data points are obtained from the one or more MLSs and, if a certain property data point is missing, another data point may be listed in its place. As additional images are displayed, new property data points may also be displayed in the property information area 35 as shown in FIG. 8.

The one or more MLSs may provide "normal" and "key" data that can be used to populate the first interactive GUI 77 described herein. Normal data may include any similar types of characteristics that relate to the property itself including, for example, property address, bedroom count, bathroom count, square footage, property characteristics (e.g., granite countertops, double bathroom sink, stainless steel appliances, etc.), year built, style, heating, cooling, location characteristics (close to parks, public transportation, etc.), foundation, roof, and acreage. Key data may include any similar characteristics that relate to the status of the property or transaction including, for example, distance from property, days on market, property price, property status (e.g., coming soon, active, under contract, continue to show, etc.), price increase/decrease, and scheduled open house dates.

The first interactive GUI 77 is displayable on the display device of the user, which may be, for example, a mobile device such as smartphone, a tablet computing device, a Personal Digital Assistant (PDA), a laptop computer, and a wearable device as further described herein.

Thereafter, the user can review the generated selection of property listings as further described herein. The generated selection of property listings can be further refined by the user by updating one or more values of the one or more search criteria. In one embodiment, the user can save the search criteria in their profile and then rerun the search using the real estate tool described herein on a different day and/or a different time, to generated additional real estate property listings that meet one or more of the search criteria.

In one embodiment, the at least the portion of the individual real estate property listing displayed in the first property display pane 17 comprises a first image depicting the individual real estate property listing. The first property data pane 17 also displays one or more property data points that meet the search criteria selected by the user using the criteria selector. In one embodiment, the first property data pane 17 displays the number of the one or more property data points that meet the search criteria selected by the user.

Referring to FIG. 6, the first property display pane 17 may include a property information area 35 displayed within the first property display window 17. The property information area 35 presents information regarding the particular real estate property listing including, for example, the street address of the property. The information in the property information area 35 is populated and updates dynamically in response to user input. As the user taps the left 33 or right 37 side of the property display pane 17, the content of the information area 35 updates to reflect different property details, while the property address remains persistently visible.

Figure 11:
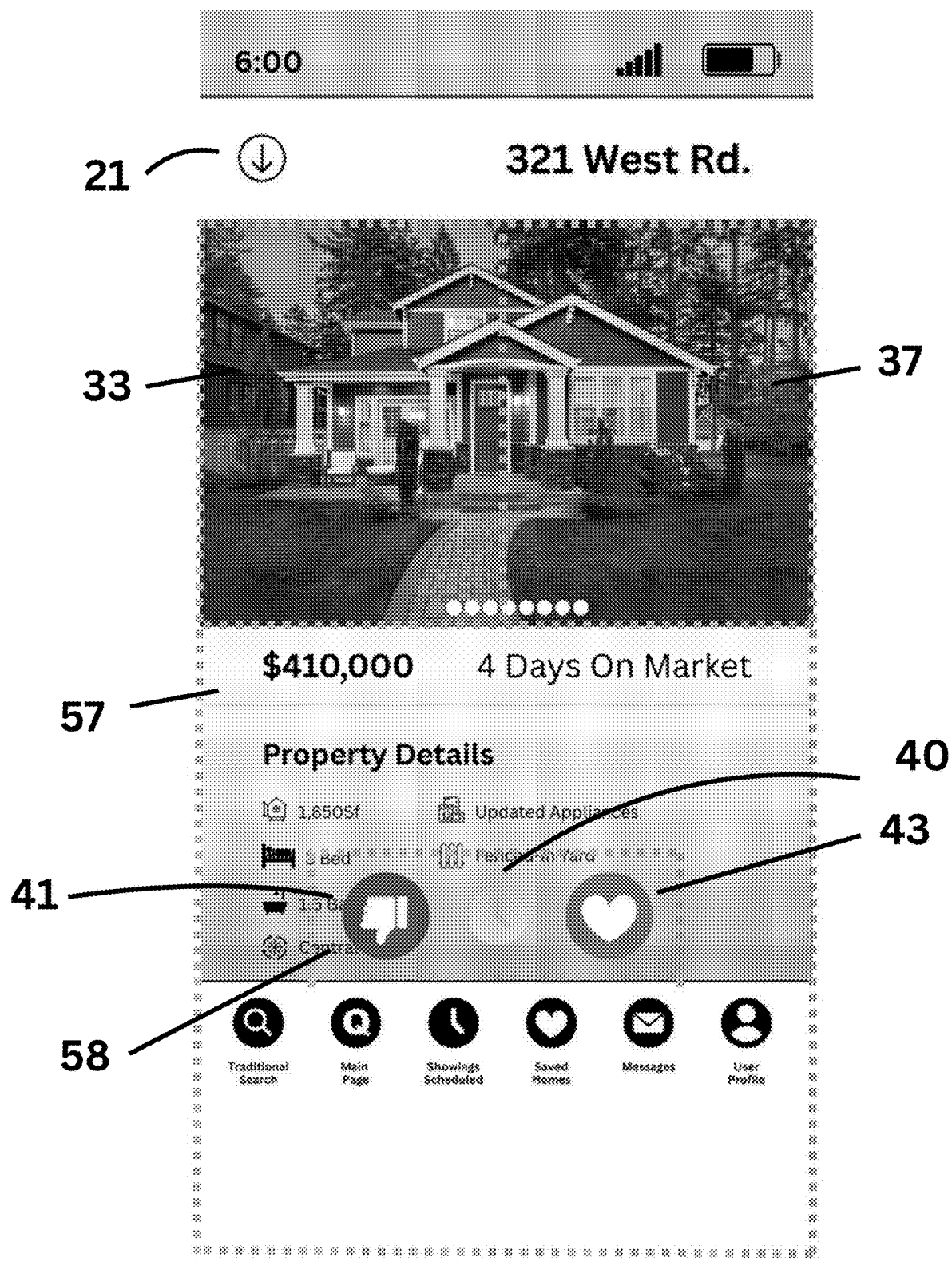
FIG. 11 depicts a second interactive GUI in accordance with one aspect of the present invention.

The property information area 35 is also tappable and, when tapped, redirects the user to a second interactive GUI as shown in FIG. 11. In one embodiment, upon tapping the property data area within the property display pane, a pop-up window is generated to display a second interactive GUI. The second interactive GUI displays, in a second property display pane, the at least the portion of the individual real estate property listing. The user may then further interact with the second interactive GUI to swipe up or swipe down within the second property display pane to view portions of the individual property listing that extend beyond the second property display pane. Upon closing the pop-up window displaying the second interactive GUI, the first interactive GUI is again displayed.

Located in the top right corner of the first property display pane 17 is a key data area 36, which displays high-level listing data (including e.g., distance from a particular point) that also updates in accordance with the currently displayed image. At the bottom of the property display pane 17, a graphic visual indicator 39 reflects the position of the current image within the total image set for the listing, updating accordingly as the user navigates through the images.

In one embodiment, the one or more property data points comprises one or more characteristics of the property depicted in the individual real estate property listing and/or one or more characteristics of the status of property depicted in the individual real estate property listing.

As described herein, upon generation of the selection of real estate property listings, at least a portion of a first individual real estate property listing 78 of the one or more real estate property listings is displayed in the first property display pane 17. In addition at least one image of the first individual real property listing 78 is displayed in the first property display pane 17.

Figure 3:
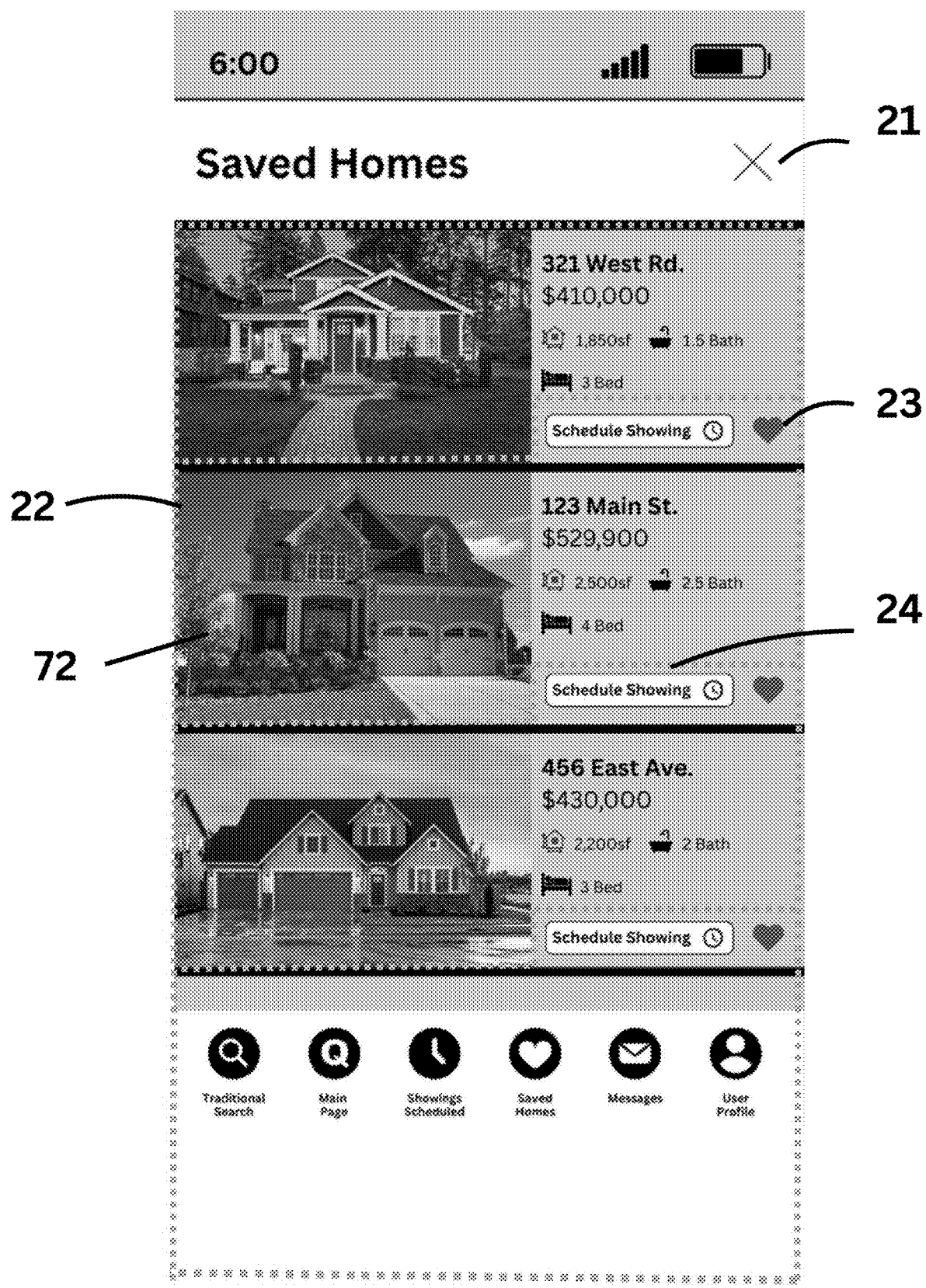
FIG. 3 depicts a saved homes window in accordance with one aspect of the present invention.

The user interacts with the first property display pane 17 of the first interactive GUI 77 to view the selection of real estate property listings comprising the one or more individual real estate property listings. As shown in FIG. 6, the user may interact with first property display pane 17 and perform one or more of the following tasks:

(1) tapping on the right portion 37 or left portion 33 of the first property display pane 17 to reveal additional information regarding the individual real estate listing displayed in the first property display pane 17. This additional information may include, for example, one or more additional images of the property and the user can tap on the right portion 37 or left portion 33 of the first property display pane 17 to view additional images of the property;

(2) swiping right 38 on the first property display window 17 to indicate a "like" of the individual real estate property listing displayed in the first property display pane 17, wherein the "liked" real estate property listing is saved to a saved homes GUI of the user as shown in FIG. 3;

(3) swiping left 34 on the first property display pane 17 to indicate "dislike" of the individual real estate property listing displayed in the first property display pane 17, wherein the "disliked" real estate property listing is removed from the selection of real estate property listings displayable to the user; and (4) swiping up 32 on the first property display pane 17 to schedule a showing of the individual real estate property listing displayed in the first property display pane 17.

Figure 13:
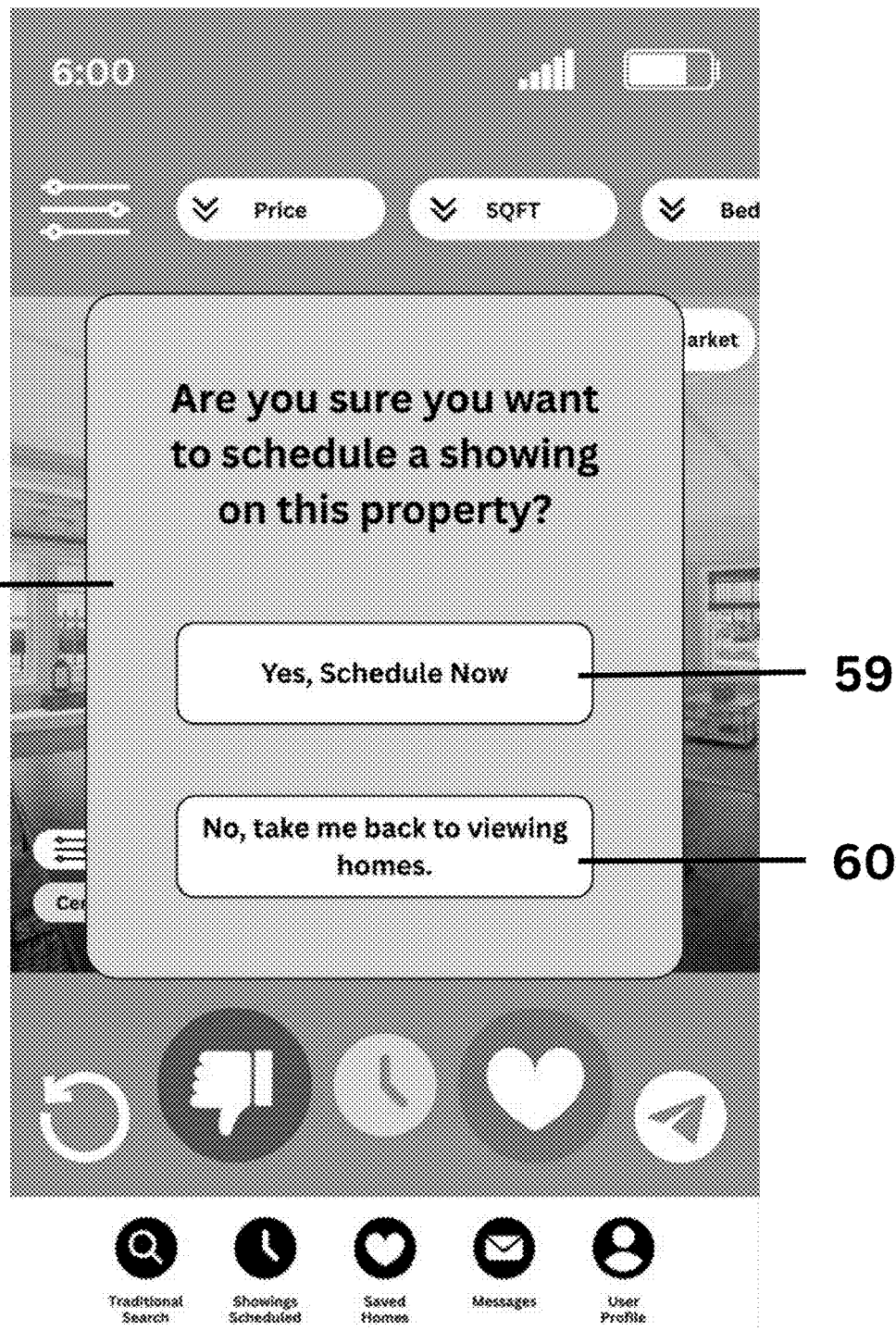
FIG. 13 depicts a pop-up window that is displayable when a user inputs a gesture or taps a button to schedule a showing.

In one embodiment, and as shown in FIG. 13, when the user swipes up 32 on the first property display pane 17, a first schedule showing pop-up window 79 is displayed, as shown in FIG. 13. As shown in FIG. 13, the user can click or tap a "yes" button 59 to schedule a showing which will open a scheduled showings window as shown in FIG. 2 and information regarding the selected individual property listing is populated in the scheduled showings window.

The schedule showing pop-up window 79, may be triggered by one of three user actions: swiping upward on a listing 32, tapping the schedule showing button 40 (shown in FIG. 7) or tapping the saved homes schedule showing button 24. The popup window contains a yes button 59 and a no button 60. When a user taps on the yes button 59, the showing request is submitted and the property populated in the scheduled showings window shown FIG. 2. When a user taps on the no button 60, the pop-up window is collapsed and the user is returned to their prior screen.

Figure 2:
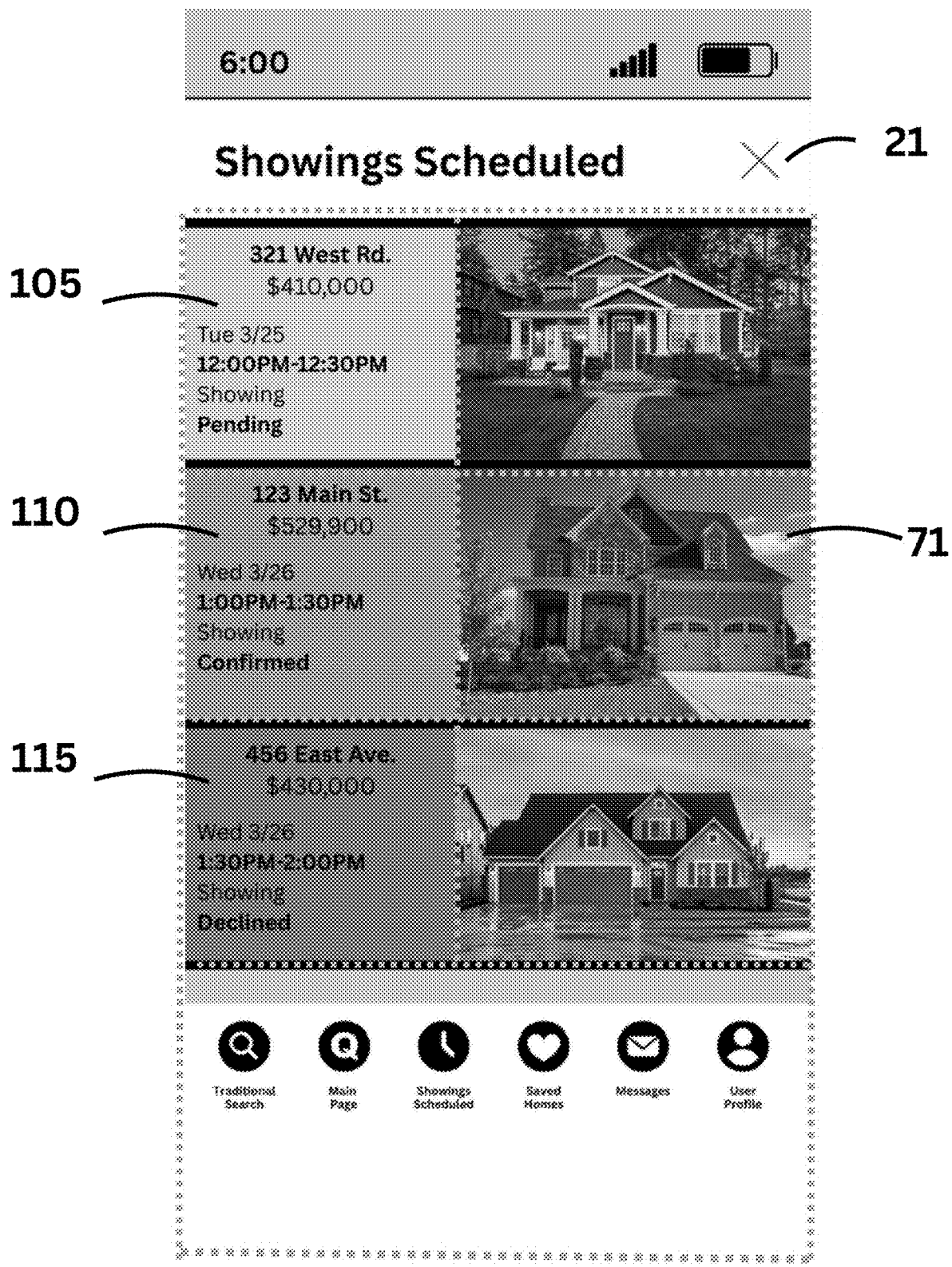
FIG. 2 depicts a showings scheduled window in accordance with one aspect of the present invention.

As shown in FIG. 2, the scheduled showings window displays one or more individual real estate property listings that the user has selected to schedule a showing. An image of each individual real estate property listing 78 is shown adjacent to the action taken in scheduling a showing. As shown in FIG. 2 this action may include a pending showing 105 that has been scheduled and not yet confirmed, a confirmed showing 110, which indicates the confirmed date and time of the showing, and a declined showing 115 in which the proposed date and time of the showing have been declined. The user can return to their previous screen by tapping button 21 or by utilizing any of the interface buttons 19.

Figure 15:
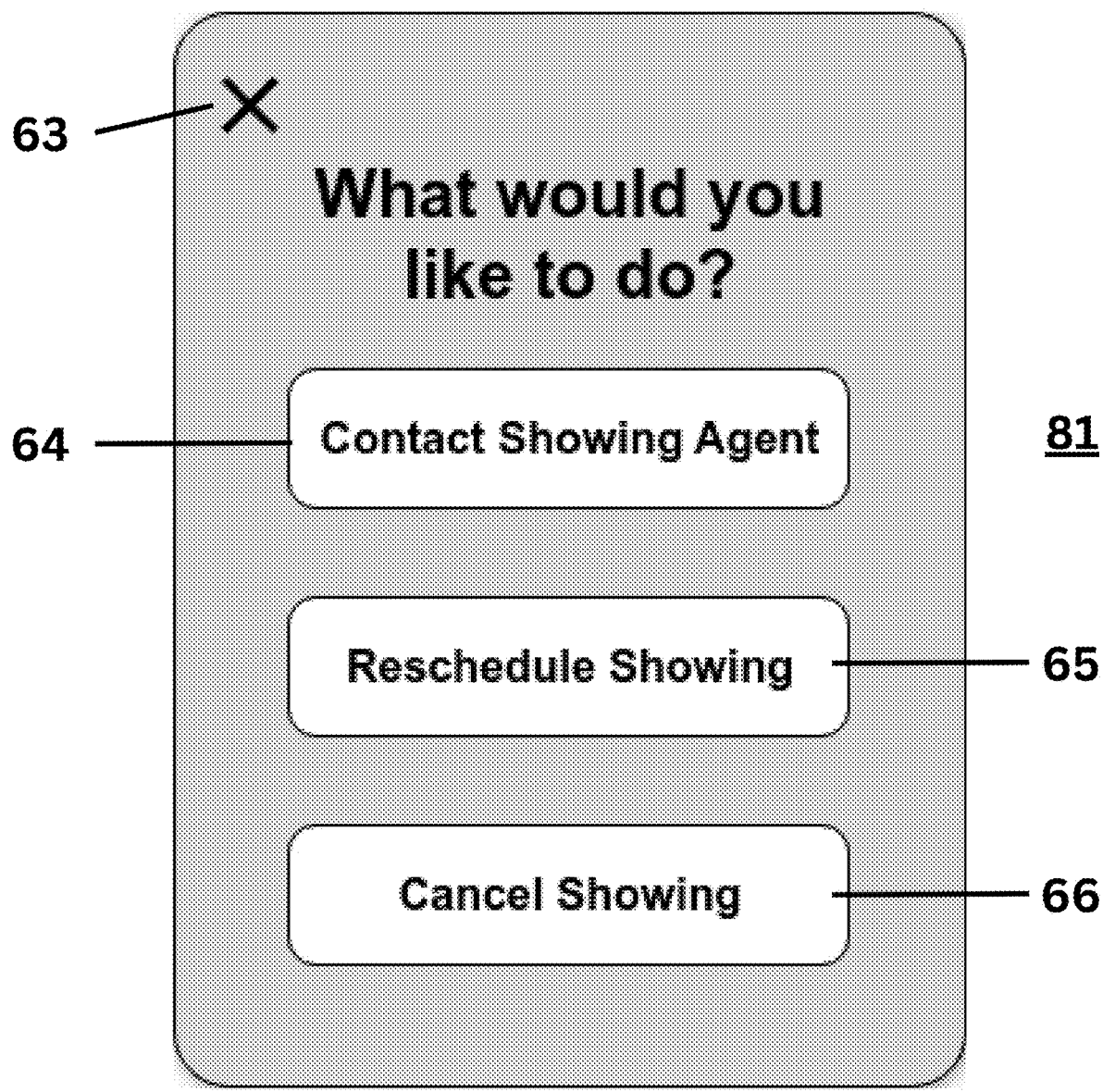
FIG. 15 depicts a pop-up window that is displayable when a user taps on a scheduled showing depicted on the scheduled showings window.

As shown in FIG. 15, a scheduled showings interaction pop-up window 81 may be triggered when the user selects a scheduled showing, see e.g., 105, 110, 115 on the showings window. The scheduled showings interaction pop-up window 81 comprises, for example, three interactive buttons: a contact showing agent button 64, a reschedule button 65, and a cancel button 66. A button 63 is also included to allow the user to exit the scheduled showings interaction pop-up window 81 without taking further action.

Figure 17:
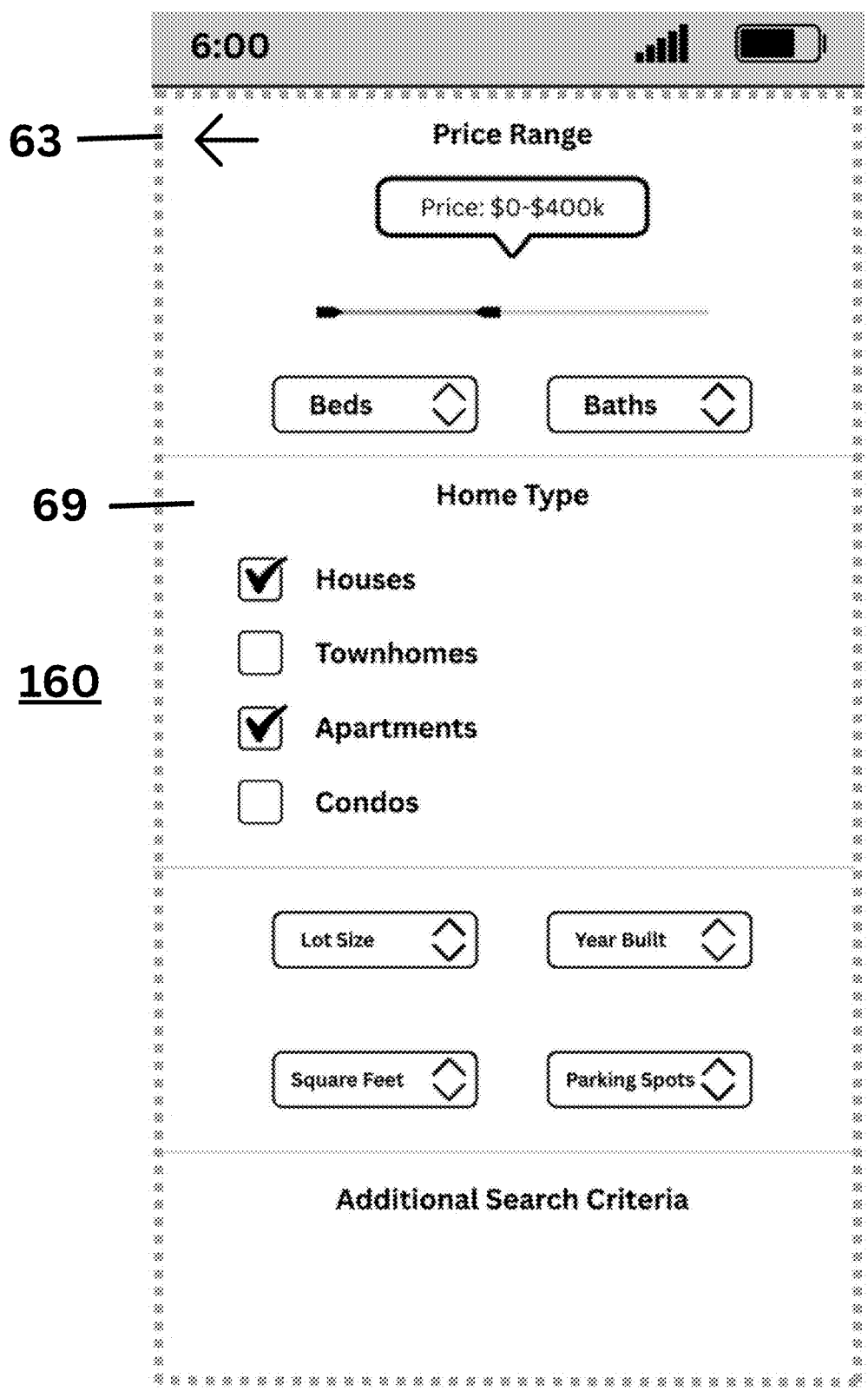
FIG. 17 depicts a full criteria selection window that allows for full customization of a user's criteria.

In one embodiment, the criteria selection pane 73 comprises a criteria menu selection button 51, wherein when the criteria menu selection pane 73 is tapped, a pop-up criteria GUI as shown in FIG. 17 is displayed. The pop-up criteria GUI displays one or more search criteria, and the method includes the step of allowing the user to interact with the pop-up criteria GUI to select one or more search criteria. Thereafter, upon closing the pop-up window by tapping button 63, the first interactive GUI 77 is displayed with the new search criteria being implemented.

Referring to FIG. 3, a saved homes window, which comprises a vertically scrollable pane 22 configured to display one or more real estate listings that have been previously saved by a user through interaction with properties shown in the first property display pane 17. The vertical scroll functionality permits an effectively unlimited number of saved properties to be accessed and reviewed. Each saved property listing includes a tappable region 72, which, when activated by tapping (or clicking), causes the interactive real estate tool to display a detailed listing window showing the saved property as shown in FIG. 11. Additionally, each saved property listing within the saved homes screen includes a button 23, which in one embodiment may be a heart icon, which, when tapped, deselects the saved property and removes the respective property from the saved property list. Each saved property listing further includes a schedule showing button 24, which, upon tapping, triggers the display of the schedule showing pop-up window 79, as shown in FIG. 13.

In one embodiment, the first interactive GUI also displays the number of properties that meet the criteria of the user and the number of properties of that list that have been viewed.

In one embodiment, and as discussed above, when the user swipes left 34 on the first property display pane 17 to indicate "dislike" of a particular individual real estate property listing displayed in the first property display pane 17, the "disliked" real estate property listing is removed from the selection of real estate property listings displayable to the user. However, these properties may be saved in a separate window to allow the user to review the disliked/discarded properties.

In addition, in one embodiment, the interactive real estate tool described herein is configured to use machine learning to identify additional properties that meet one or more of the search criteria of the user based on the likes and/or dislikes of the user. For example, if the user dislikes/discards properties containing one or more identifiable criteria (e.g., paint color, number of floors, landscaping, etc.), the interactive real estate tool can search for and/or identify additional properties for the user's review that meet these one or more identifiable criteria.

Figure 4:
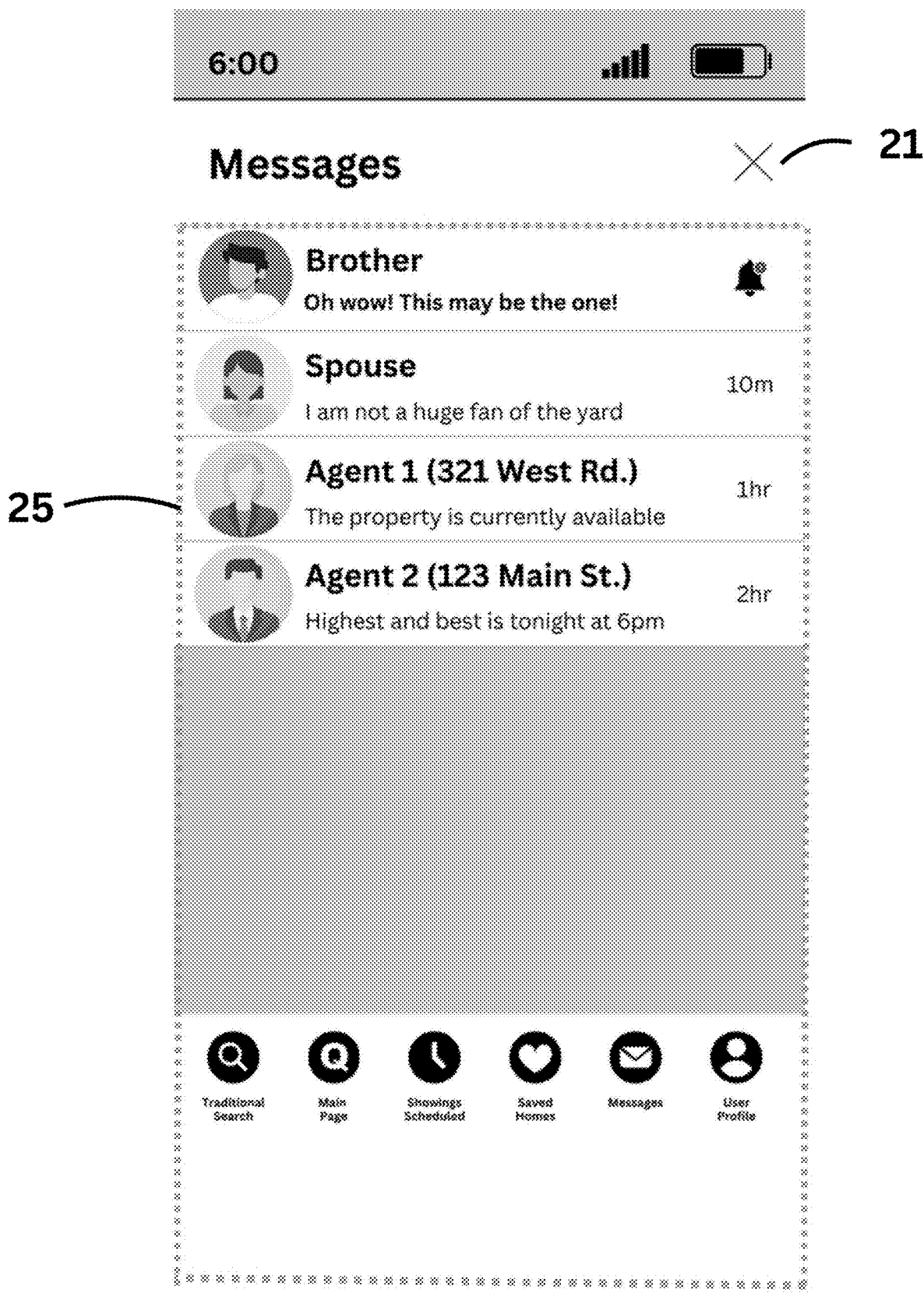
FIG. 4 depicts a messages window in accordance with one aspect of the present invention.

FIG. 4 depicts a messages window comprising a vertically scrollable messaging pane 25 that displays one or more two-way communications between the user and one or more external parties, including, for example, a real estate agent, family member, or friend. The messaging functionality enables the exchange of property details, images, and text messages between the user and the one or more external parties. To exit the messages window, the user may tap or click button 21 or tap or click any of the persistent interface navigation buttons 19.

Figure 5:
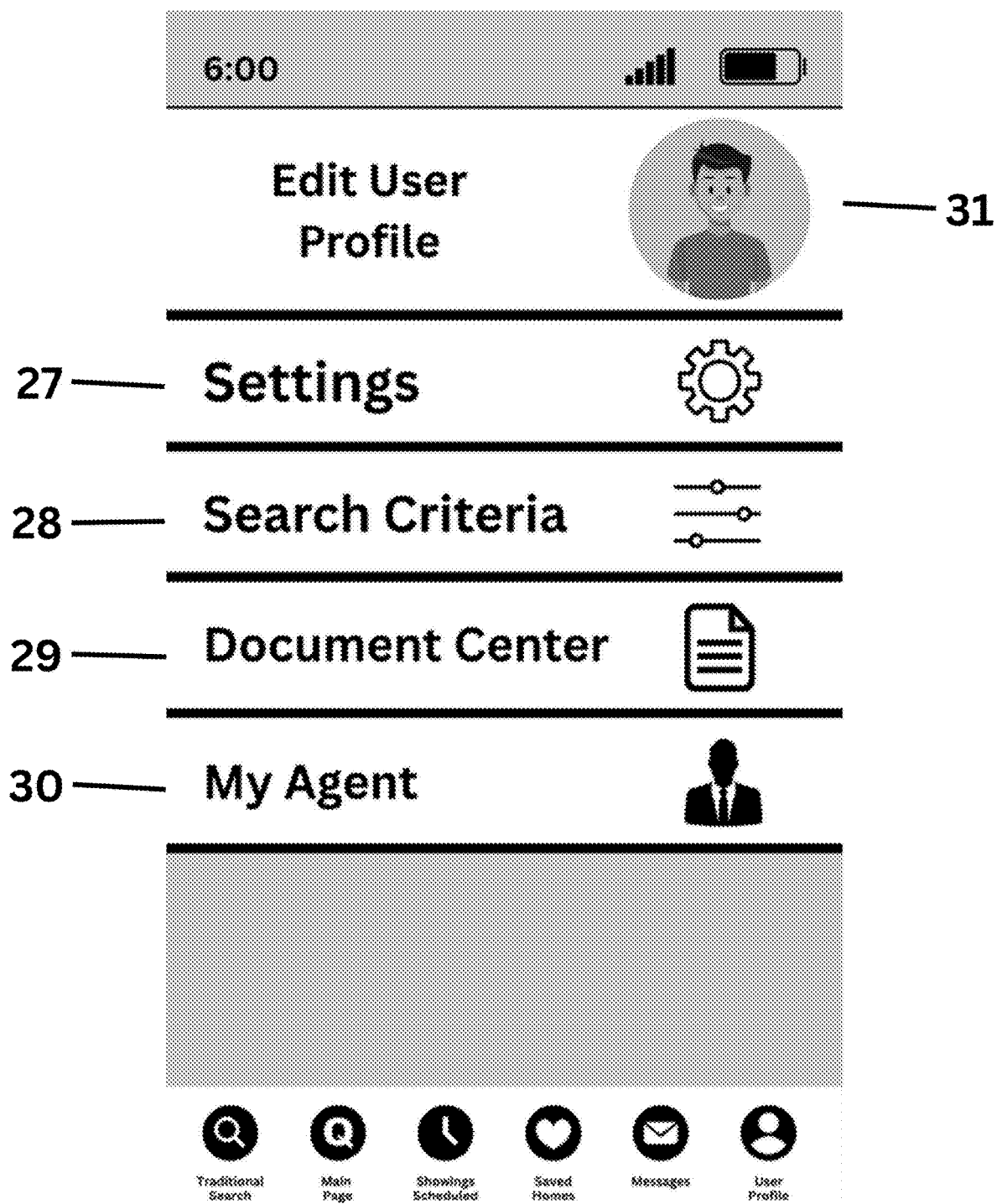
FIG. 5 depicts a user profile window in accordance with one aspect of the present invention.

FIG. 5 depicts a user profile window that includes multiple interactive elements 27-31 to allow the user to configure the interactive real estate tool according to their personal preferences and needs. These elements include, for example, a user profile button 31, a settings button 27, a search criteria button 28, a document center button 29, and a "my agent" button 30.

The user profile button 31 enables editing and authentication of personal information including but not limited to email address, password, and profile image. Authentication can include the use of one or more of usernames, passcodes, biometrics, device identification, and other means of authenticating. The location of the mobile device can also be determined based on GPS or via network communication. Authentication can also include the determination of a user's location based on the location of the user's portable electronic device.

In one embodiment, a GPS-based or other location detection based method and system is implemented, wherein when a user logs onto the system from a location using a mobile device (e.g., tablet, laptop, smart phone, Wi-Fi enabled computer, etc.), the location of the mobile device of the user is determined and sent to the system so that the interactive real estate tool learns the location of the user. Based on that location, in one embodiment, the interactive real estate tool may be configured to suggest real estate properties within a certain distance of the defined location. In another embodiment, the user can define a certain geographic location, and distance from that geographic location, for a search of relevant real estate properties.

The settings pane 27 provides access to application-level options including but not limited to: display mode light/dark, display language, currency settings, and notification preferences. The search criteria pane 28 allows for the configuration of property filters. The document center pane 29 provides access to shared documents, including but not limited to: buyer representation agreements. The my agent pane 30 displays the contact information and profile of an agent with whom the user has either executed a buyer agency agreement or selected as their preferred representative within the application. The user may exit the profile window by tapping or clicking any of the navigation buttons 19.

Figure 7:
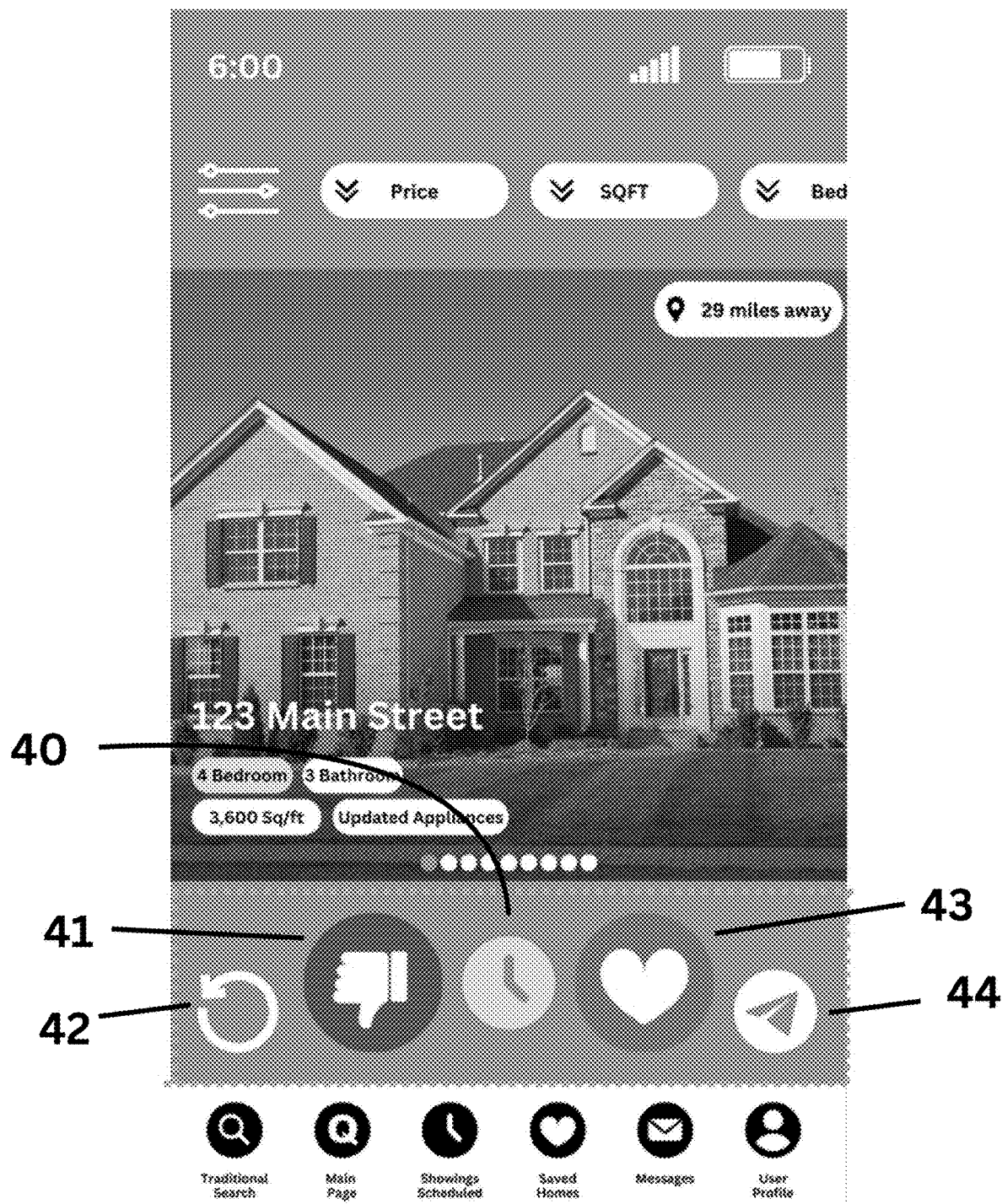
FIG. 7 depicts another view of the home screen of the first interactive GUI.
Figure 14:
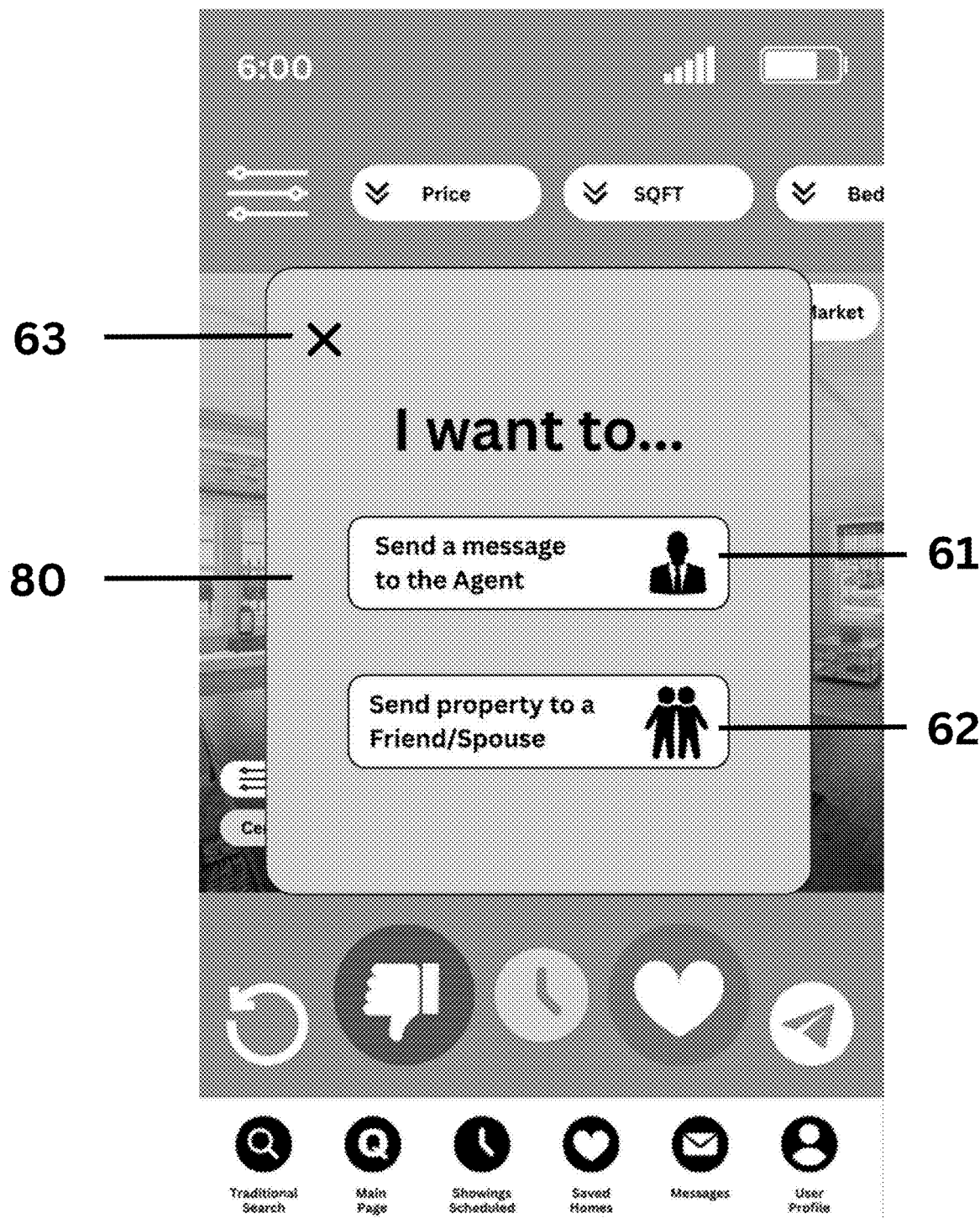
FIG. 14 depicts a pop-up window that is displayable when a user taps or clicks the send message button.

FIG. 7 depicts an action button pane 18 that provides an alternative method of interaction beyond gesture-based controls 32, 34, 38. The pane comprises a plurality of buttons, including, for example, a rewind button 42, a dislike button 41, a schedule showing button 40, a like button 43, and a send message button 44. The rewind button 42, when tapped or clicked, reverts the most recent action and re-displays the previously viewed property in the display window 17, unless the prior action was a confirmed showing request via popup 79. The dislike button 41 removes the current property from view and loads the next property into the window. The schedule showing button 40 triggers the pop-up window 79 as seen in FIG. 13. The like button 43 saves the property to the saved homes window shown in FIG. 3 and advances to the next property. The send message button 44 opens the send message pop-up window 80, as shown in FIG. 14.

Figure 9:
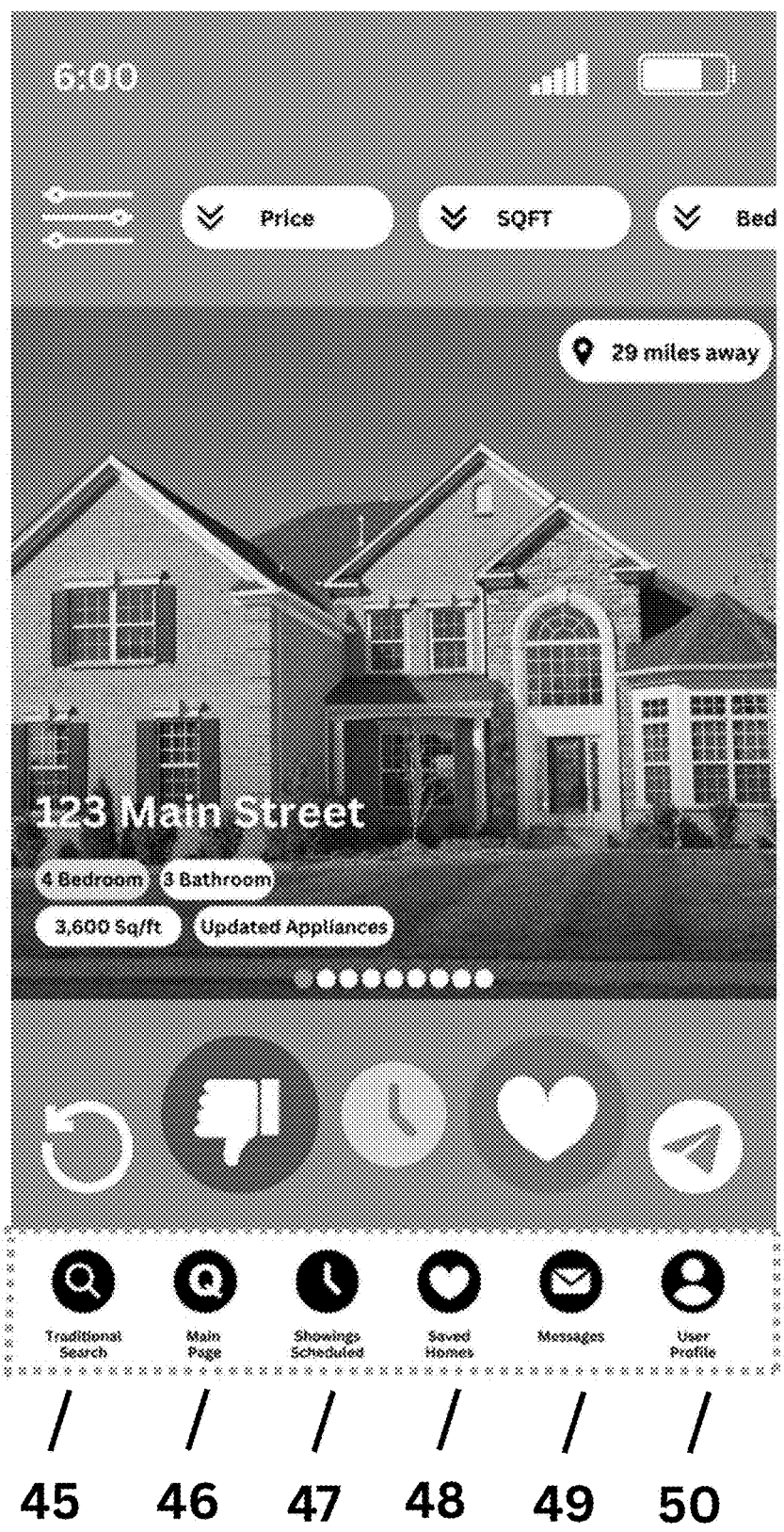
FIG. 9 depicts another view of the home screen of the first interactive GUI.

As shown in FIG. 9, the application includes a persistent bottom navigation pane comprising one or more interface buttons 45-50. These one or more interface buttons may include, for example, a traditional search button 45 wherein, upon clicking or tapping on this button, a conventional real estate search window is open. In addition, these buttons may include a main page button 46 to return to the user to the first interactive GUI 77. A showings scheduled button 47 may be used to access the scheduled showings window shown in FIG. 2. A saved homes button 48 may be used to return to the saved homes window shown in FIG. 3. A messages button 49 may be clicked or tapped to access the messages window shown in FIG. 4. A user profile button 50 may be clicked or tapped to access the user profile window shown in FIG. 5. Other interface buttons may also be included.

FIG. 11 depicts an example of a fully detailed property listing window. This window is opened by the user interacting with the property information area 35 of the first property display pane 17 of the first interactive GUI 77, a saved property listing 72 (see FIG. 3) or a scheduled showing listing 71 (see FIG. 3) The property listing window is vertically scrollable 57, enabling display of additional information not visible in the initial view. The user may navigate through real estate listing images by tapping either the left portion 33 or right portion 37 of the image. Fixed at the bottom of the window is a detailed property action pane 58, including dislike 41, schedule showing 40, and like 43 buttons. These buttons function identically to those depicted in FIG. 7, except that each button also returns the user to the first interactive GUI 77 upon tapping. The user may exit the fully detailed property window by tapping button 21 or by utilizing the navigation buttons 19.

Figure 12:
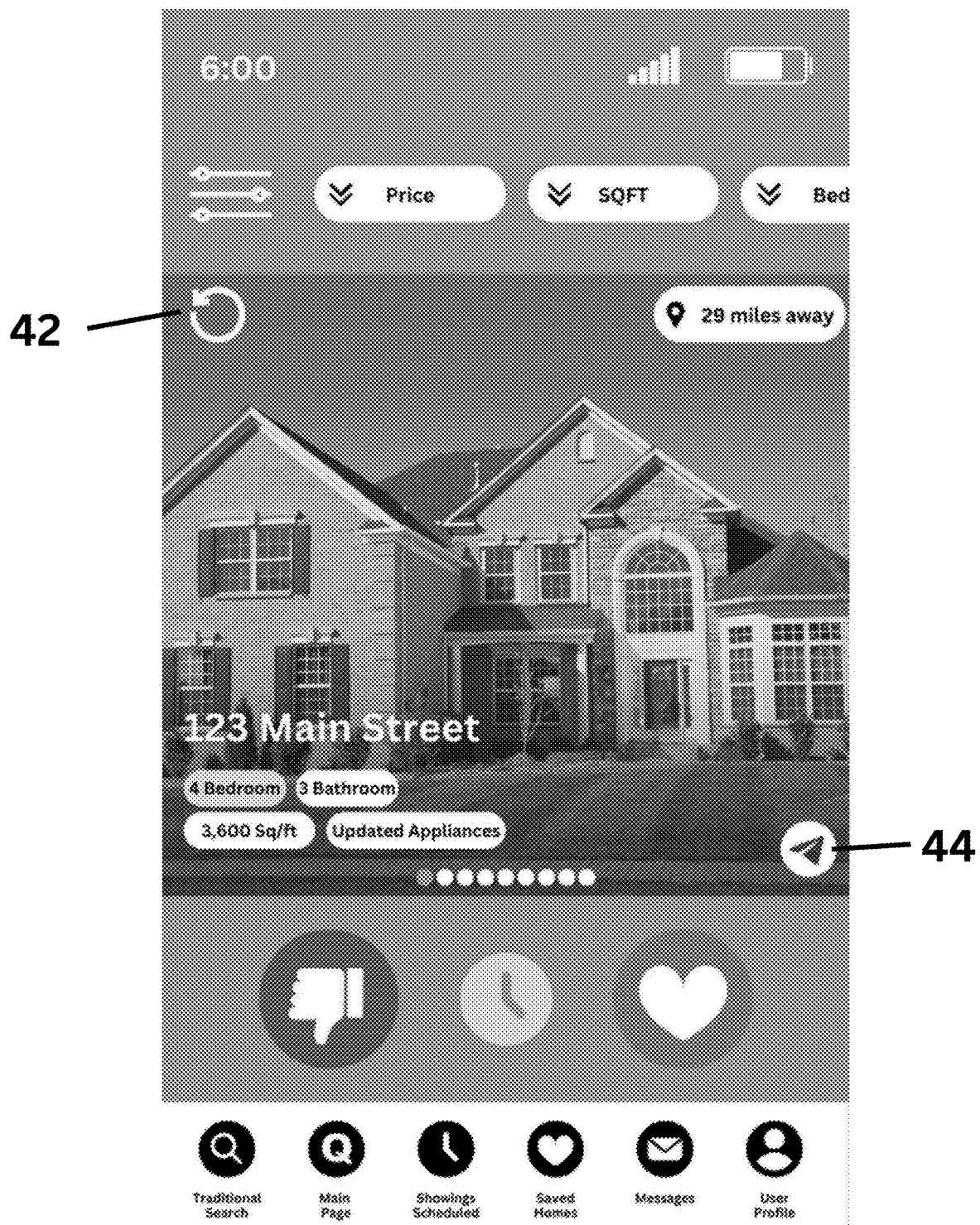
FIG. 12 depicts an alternative layout of the first interactive GUI.

FIG. 12 illustrates an alternate layout of the first interactive GUI 77, in which the rewind button 42 is repositioned to the top-left corner of the first property display pane 17 and the send message button 44 is located in the bottom-right corner of the first property display pane 17. The functionality of each button remains consistent with prior descriptions, although the layout results in a more visually streamlined presentation of the action button pane 18.

FIG. 14 depicts a send message pop-up window 80, that may be triggered via the send message button 44. The pop-up window includes, for example, two options: an agent button 61 and a friend/family button 62. The agent button 61 allows the user to send a message to one of the following, depending on system logic: the listing agent, the user's contracted agent, a designated in-app agent, or a randomly assigned agent in a lead rotation system. The friend/family button allows the user to share the listing internally with one or more third parties if the recipient has the interactive real estate tool installed or externally using the device's native messaging protocol e.g., iMessage. A button 63 is provided to allow the user to cancel out of the message pop-up window without sending a message.

Figure 16:
FIG. 16 depicts the dropdown buttons that are displayed in the scrollable criteria pane.

FIG. 16 illustrates an example of an interactive dropdown menu 52 located within the criteria selector pane 73 of the first interactive GUI 77 in accordance with one aspect of the invention. The interactive dropdown menu 52 can toggle between a retracted state 67 and an extended state 68. When extended, a slider control 150 is displayed, allowing the user to modify a specific search criteria e.g., price. In one embodiment, all dropdown menus 52-56 share this structure, with differences only in the underlying criteria modified e.g., beds, baths, year built. Changes executed in a dropdown menu are reflected in the full criteria menu 160, as shown in FIG. 17. In another embodiment, only some of the drop down menus share this structure.

FIG. 17 presents a full criteria window 160, activated via a criteria menu selection button 51. This vertically scrollable window 69 includes a comprehensive set of search criteria supported by real estate MLS systems. The menu includes but is not limited to: interactive elements such as sliders, dropdown menus, checkboxes, input fields, and toggles. The user may exit the full criteria window 160 by tapping button 63 or, if applicable, the persistent interface buttons 19.

Figure 18:
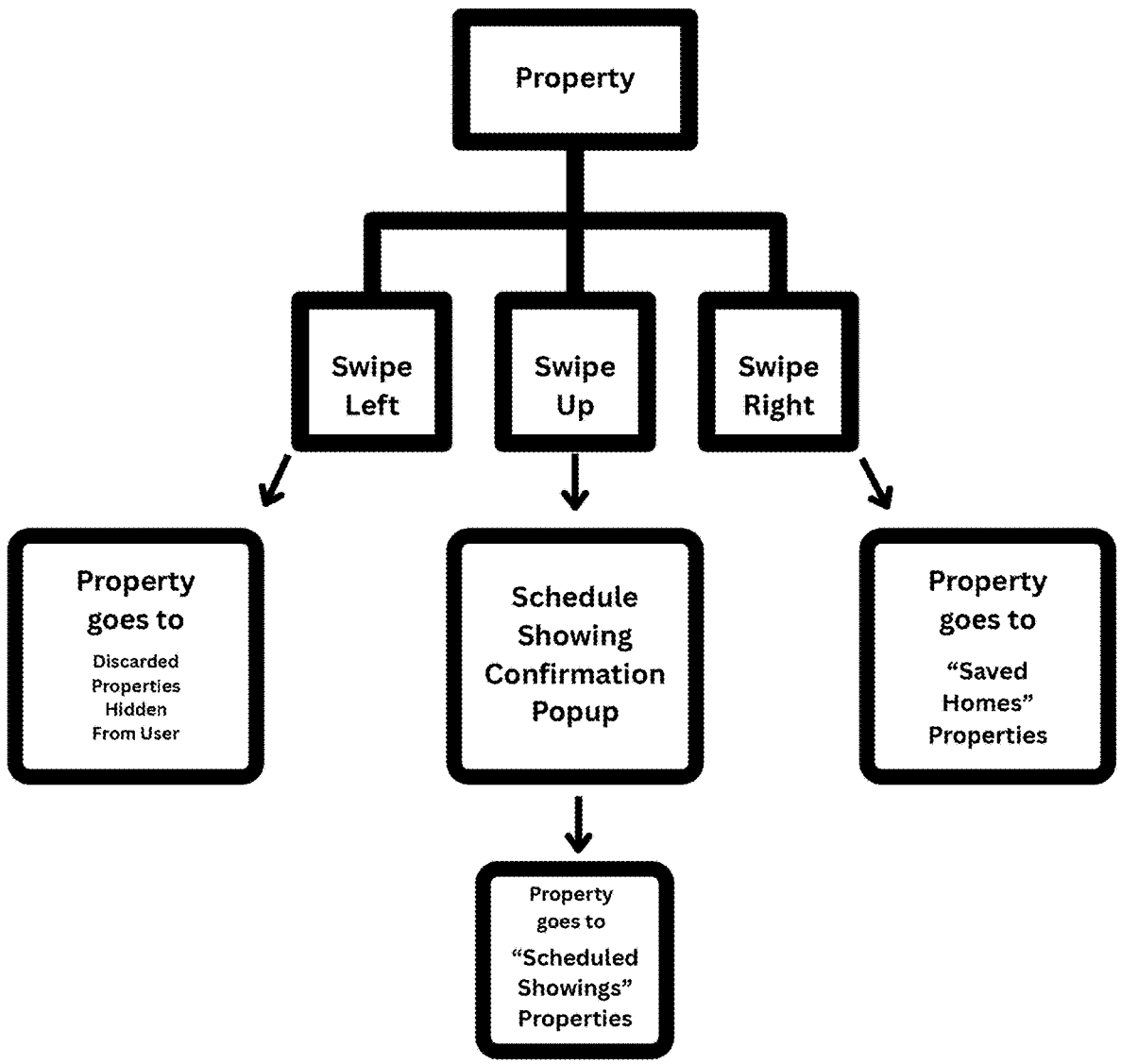
FIG. 18 depicts a flowchart that demonstrates the actions that may happen when a user inputs their gesture on the home screen of the first interactive (GUI).

FIG. 18 depicts a flowchart that illustrates the results of user swipe gestures 32, 34, 38 within the property display pane 17. A swipe-left 34 discards the property; a swipe-up 32 activates the schedule showing popup 79; and a swipe-right 38 saves the property to the saved homes screen FIG. 3. In each case, a new property is subsequently loaded into the first property display pane 17.

Figure 19:
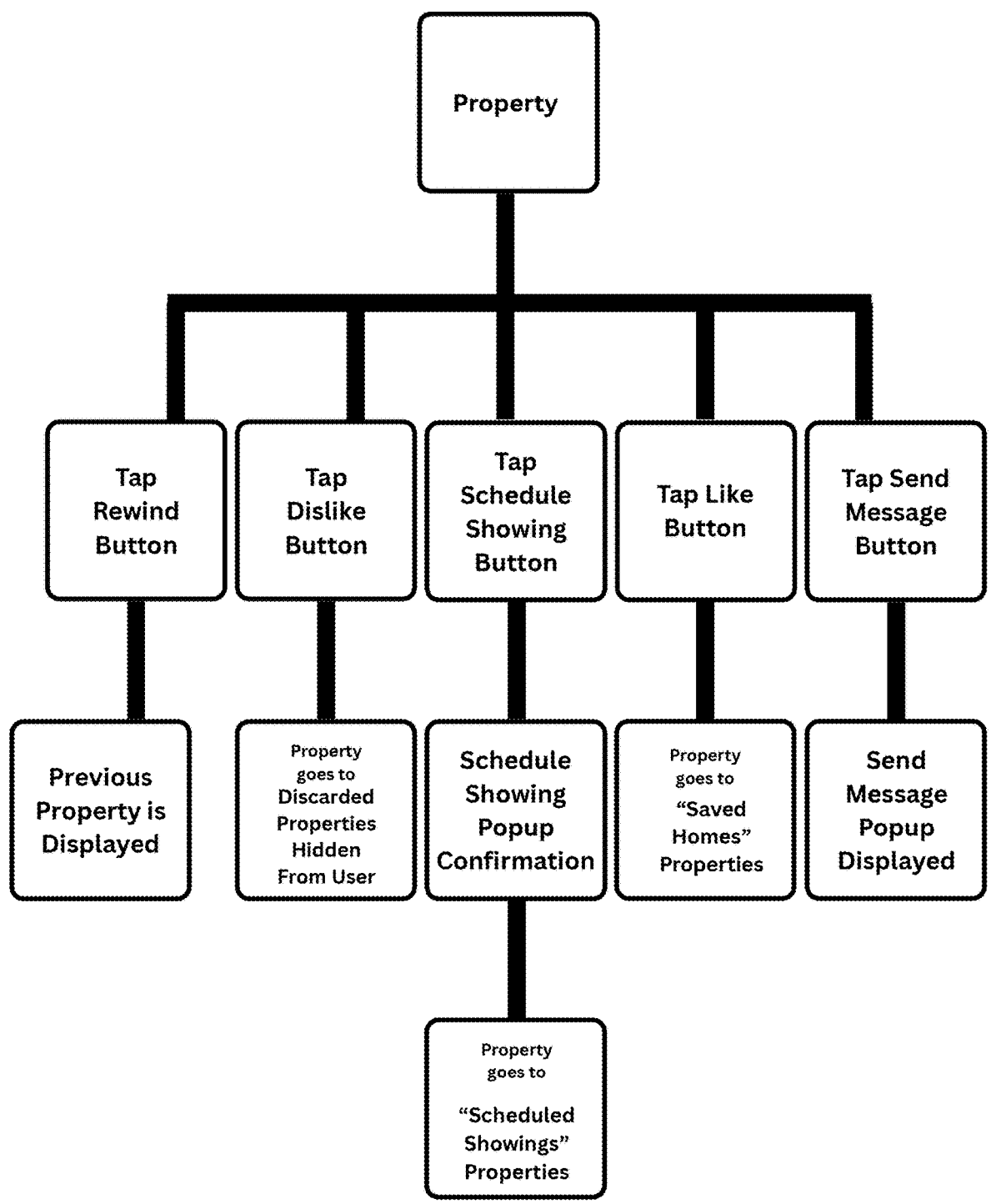
FIG. 19 depicts a flowchart that demonstrates the actions that may happen when a user utilizes any one of the action buttons of the first interactive (GUI).

FIG. 19 depicts a similar flowchart that illustrates interactions with action buttons 40-44 within the action button area 18 which interactions may include tapping or clicking. The rewind button 42 reverts the previous action unless that action involved a user confirmed showing request. The dislike button 41 discards the listing and advances to the next property. The schedule showing button 40 triggers the schedule showing pop-up window 79. The like button 43 saves the listing and loads the next one. The send message button 44 triggers the send message pop-up window 80, and if the user proceeds, they are directed to the messages screen FIG. 4.

Figure 20:
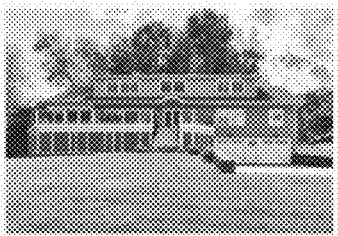
FIG. 20 depicts an example of a typical full MLS listing sheet including information that typically be fetched and/or displayed within the interactive real estate tool described herein.

FIG. 20 illustrates an example of a conventional MLS listing page, from which data is fetched for population across the application. The data is categorized into normal data and key data. Normal data includes but is not limited to: general listing attributes such as address, square footage, beds, baths, style, heating, cooling, acreage, and year built. Key data pertains to but is not limited to: status-sensitive information such as price, days on market, listing status, proximity to user, and open house schedules. Normal data populates the property information area 35 and detailed listing screen FIG. 11, while key data populates the key data area 36 and also appears within the detailed listing screen FIG. 11. All data is retrieved from a local MLS database system.

The application will now be described with reference to the following non-limiting examples:

EXAMPLE

The user launches the interactive real estate search tool as described above with the intention of searching specifically for Colonial-style homes.

From the main screen first interactive GUI 77, the user accesses the criteria selection pane 73, as shown in FIG. 1, and taps the criteria menu selection button 51 to begin customizing their search. This brings up the full criteria menu 160, where the user applies their desired filters, in this case, choosing "Colonial" as the architectural style. Once satisfied with the selected criteria, the user taps the back button 63 to return to the main screen of the first interactive GUI 77.

Immediately, the interactive real estate tool refreshes and populates the listing queue with properties that match the newly applied filters. The user may then begin exploring the results.

1. The user views the first property listing populating the property display pane 17. This first property listing does not appeal to them and so the user swipes left 34. This action removes the property from the display screen and ensures that it remains hidden from future views.
2. A second property listing is then populated in the property display pane 17. This second listing is more intriguing. The user taps through the images of the property displayed in the property display pane 17 using interaction feature 37 & 33 to appreciate the home's layout and visual appeal. Wanting more details, the user may then tap the property information area 35, which opens the full property listing view as displayed in FIG. 11.

3. After reviewing the full description and features, the user may then decide to save the second property listing by tapping the like button 43. This adds the second property listing to their saved homes GUI, as shown in FIG. 3, and the interface automatically returns them to the main screen of the first interactive GUI 77, where the next property that matches the search criteria is now populated.

4. This third property listing immediately captures the user's attention. Without hesitation, the user swipes up 32 to schedule a showing. This action triggers the schedule showing pop-up window 79, as shown in FIG. 13. The user may then confirm their interest in this third property listing by tapping the yes button 59. The pop-up window 79 collapses, the property is added to the scheduled showings window depicted in FIG. 2, and the main screen of the first interactive GUI 77 then reloads and the property display pane 17 is populated with the next property listing in queue. The user may then continue to view additional property listings in the queue.

5. Curious about another property listing but unsure about it, the user decides to ask a friend for a second opinion. The user then taps the send message button 44, prompting the send message pop-up window 80 to be displayed, as illustrated in FIG. 14. The user selects the friend/family button 62, which opens the messages screen, as seen in FIG. 4, and the user can then share details of the property listing with their friend.

6. Wanting to revisit a previously liked property listing, the user then taps the saved homes button 48 located within the pane depicting one or more persistent interface buttons 19. The first interactive GUI 77 transitions to the saved homes GUI as shown FIG. 3, which displays all of the user's previously liked property listings. The user may then identify the particular property listing they would like to revisit and tap the corresponding tappable region 72, which loads the detailed view once again via the full listing window as shown in FIG. 11.

7. After a second look at the particular property listing, the user realizes the property may not be the right fit after all. The user may then exit the detailed view by tapping the back button 21, which returns them to the saved homes GUI. From there, the user can remove the property listing from their saved list by tapping the heart button 23, effectively clearing it from their collection of saved homes depicted in the saved homes GUI.

8. The user may continue to interact with the interactive real estate tool until all of the property listings that meet the search criteria have been viewed. At this time, the user can choose to rerun the search with additional and/or different criteria if desired to view additional property listings.

What is claimed is:

1. A computer-implemented method for searching, viewing and saving real estate property listings, wherein the computer-implemented method comprises at least a processor to execute instructions, a memory therein to store instructions, and a database populated with real estate listings, wherein the database is accessible by the processor, wherein the method comprises:

executing instructions via the processor, wherein the processor is programmed to (a) access data stored in the database, and (b) generate a first interactive graphical user interface (GUI) at a user computing device to be interacted with by a user to search, view, and save one or more individual real estate property listings, wherein the first interactive GUI comprises a criteria selector pane, a first property display pane, one or more action buttons, and one or more user interface buttons;

populating the first interactive GUI with the data related to the real estate property listings, wherein the data related to the real estate property listings comprises one or more individual real estate property listings, and wherein the data related to the real estate property listings is stored in the database;

displaying, on a display device, the first interactive GUI;

allowing a user to interact with the first interactive GUI to generate a selection of real estate property listings comprising one or more individual real estate property listings, wherein the selection of real estate property listings is generated by selecting search criteria using the criteria selector pane, wherein upon generation of the selection of real estate property listings, at least a portion of an individual real estate property listing of the one or more real estate property listings is displayed in the first property display pane;

allowing a user to interact with the first property display pane of the first interactive GUI to view the selection of real estate property listings comprising the one or more individual real estate property listings and perform one or more of:

(1) tapping on a right portion or left portion of the first property display pane to reveal additional information regarding the individual real estate listing displayed in the first property display pane, optionally, wherein the additional information includes one or more additional images of the property;

(2) swiping right on the first property display pane to indicate a "like" of the individual real estate property listing displayed in the first property display pane, wherein the "liked" real estate property listing is saved to a saved homes GUI;

(3) swiping left of the first property display pane to indicate "dislike" of the individual real estate property listing displayed in the first property display pane, wherein the "disliked" real estate property listing is removed from the selection of real estate property listings displayable to the user; and (4) swiping up on the first property display pane to schedule a showing of the individual real estate property listing displayed in the first property display pane, wherein swiping up on the first property display, a schedule showing pop-up window is displayed.

2. The method according to claim 1, wherein the at least the portion of the individual real estate property listing displayed in the first property display pane comprises a first image displaying a photograph depicting the individual real estate property listing and a property data pane, wherein the property data pane displays one or more property data points that meet the search criteria selected by the user using the criteria selector.

3. The method according to claim 2, wherein the property data pane displays the number of the one or more property data points that meet the search criteria selected by the user.

4. The method according to claim 2, wherein the one or more property data points comprises one or more characteristics of the property depicted in the individual real estate property listing and/or one or more characteristics of the status of property depicted in the individual real estate property listing.

5. The method according to claim 2, wherein upon tapping the property data pane within the first property display pane, a pop-up window is generated to display a second interactive GUI, wherein the second interactive GUI displays, in a second property display pane, the at least the portion of the individual real estate property listing;

the method further comprising the step of allowing the user to interact with the second interactive GUI to swipe up or swipe down within the second property display pane to view portions of the individual property listing that extend beyond the second property display pane;

wherein upon closing the generated pop-up window displaying the second interactive GUI, the first interactive GUI is displayed.

6. The method according to claim 1, wherein the criteria selector pane comprises one or more drop-down menus to allow the user to select one or more search criteria, wherein the one or more search criteria are selected from the group consisting of location, price, property type, square footage, number of bedrooms, number of bathrooms, one or more property features, one or more community features, and combinations of the foregoing.

7. The method according to claim 6, wherein the criteria selector pane is swipeable, wherein the user can swipe left or swipe right to display additional search criteria that extend beyond the criteria selector pane.

8. The method according to claim 5, wherein the criteria selector pane comprises a criteria menu selection button, wherein when the criteria menu selection button is tapped, a pop-up criteria GUI is displayed, wherein the pop-up criteria GUI displays one or more search criteria, the method comprising the step of allowing the user to interact with the pop-up criteria GUI and select one or more search criteria;

wherein upon closing the generated pop-up window, the first interactive GUI is displayed.

9. The method according to claim 1, further comprising the step of allowing the user to undo or rewind an action of the user using an undo button, wherein when the user selects the undo button, the act of swiping right on the first property pane to indicate the "like" of the individual real estate property listing displayed in the first property pane or the act of swiping left on the first property pane to indicate the "dislike of the individual real estate property listing displayed in the first property pane is undone.

10. The method according to claim 1, wherein upon display of the schedule showing pop-up window, allowing the user to interact with the schedule showing pop-up window to schedule a showing of the selected individual real estate property listing.

11. The method of claim 1, wherein the first interactive GUI remains in a suspended state when the schedule showing pop-up window is displayed.

12. The method of claim 1, wherein the one or more user interface buttons comprise tappable buttons selected from the group consisting of a search button, a main page button, a showings scheduled button, a saved homes button, a messages button, a user profile button, and combinations of one or more of the foregoing.

13. The method of claim 12, wherein upon selection of the showings scheduled button by the user, a showings scheduled GUI is displayed, wherein the showings scheduled GUI displays information related to one or more selected individual real estate property listings, wherein the information for each selected individual real estate property listing includes one or more of an image of the selected property depicted in the selected individual real estate property listing, property address, property price, and time of showing.

14. The method of claim 13, wherein upon selection of the saved homes button by the user, the saved homes GUI is displayed, wherein the saved homes GUI displays information related to the one or more selected individual real property listings "liked" by the user.

15. The method according to claim 14, wherein upon tapping on one of the one or more selected individual real property listings displayed in the saved homes GUI, the first interactive GUI is displayed and the selected individual real property listing is displayed in the first property display pane.

16. The method according to claim 5, wherein upon tapping on one of the one or more selected individual real property listings displayed in the saved homes GUI, the second interactive GUI is displayed and the selected individual real property listing is displayed in the second property display pane.

17. The method of claim 15, wherein if one of the selected individual real estate property listings depicted in the saved homes GUI is no longer available, the selected individual real estate property listing is removed from the display.

18. The method according to claim 14, wherein the information related to the one or more selected real estate properties includes a tappable button to schedule a showing of a selected individual real estate property listing.

19. The method according to claim 18, wherein upon display of the schedule showing pop-up window, allowing the user to interact with the schedule showing pop-up window to schedule a showing of the selected individual real estate property listing.

20. The method of claim 17, wherein the saved homes GUI remains in a suspended state when the schedule showing pop-up window is displayed.

21. The method of claim 13, wherein upon selection of the messages button, a pop-up messages window is displayed with tappable buttons to allow the user to interact with the pop-up messages window to send a message to a real estate agent or to send information related to the one or more selected individual real estate property listings to another person.

22. The method of claim 21, wherein when the user taps one of the tappable buttons on the pop-up messages window to send a message to the real estate agent or to send information to another person, a messaging GUI is displayed.

23. The method of claim 13, wherein upon selection of the user profile button, a user profile GUI is displayed and allowing the user to interact with the user profile GUI to define user specific information comprising one or more of profile details, settings, search criteria, documents, and agent profile.

24. The method according to claim 1, wherein the display device is selected from the group consisting of a tablet, a phone, a laptop computer, a computer monitor, and combinations of one or more of the foregoing.

* * * * *